United States Patent
Gupta et al.

(10) Patent No.: US 11,122,461 B2
(45) Date of Patent: Sep. 14, 2021

(54) FLEXIBLE BUFFER MANAGEMENT FOR OPTIMIZING CONGESTION CONTROL USING RADIO ACCESS NETWORK INTELLIGENT CONTROLLER FOR 5G OR OTHER NEXT GENERATION WIRELESS NETWORK

(71) Applicant: AT&T Intellectual Property I, L.P., Atlanta, GA (US)

(72) Inventors: Varun Gupta, Morristown, NJ (US); Rittwik Jana, Montville, NJ (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 128 days.

(21) Appl. No.: 16/518,956

(22) Filed: Jul. 22, 2019

(65) Prior Publication Data
US 2021/0029580 A1 Jan. 28, 2021

(51) Int. Cl.
*H04W 28/02* (2009.01)
*H04W 24/08* (2009.01)
*H04L 12/863* (2013.01)
*H04W 24/02* (2009.01)

(52) U.S. Cl.
CPC ......... *H04W 28/0289* (2013.01); *H04L 47/50* (2013.01); *H04W 24/02* (2013.01); *H04W 24/08* (2013.01); *H04W 28/0268* (2013.01); *H04W 28/0278* (2013.01)

(58) Field of Classification Search
CPC ......... H04W 28/0289; H04W 28/0268; H04W 28/0278; H04W 24/02; H04W 24/08; H04L 47/50
See application file for complete search history.

(56) References Cited

U.S. PATENT DOCUMENTS

| 2014/0126379 A1* | 5/2014 | Calo | H04W 24/02 370/237 |
| 2016/0150421 A1* | 5/2016 | Li | H04L 41/0816 370/235 |

OTHER PUBLICATIONS

Cardwell et al., "BBR: Congestion-Based Congestion Control," ACM Queue, vol. 14, No. 5, pp. 50:20-50:53, Oct. 2016. 34 pages.
(Continued)

*Primary Examiner* — Melvin C Marcelo
(74) *Attorney, Agent, or Firm* — Amin, Turocy & Watson, LLP

(57) ABSTRACT

Various embodiments disclosed herein provide for flexible buffer management that optimize congestion control using radio access network (RAN) intelligent controller. According to some embodiments, a system can comprise monitoring a performance of a communication traffic flow using a group of buffer parameters of a network node device of a wireless network, wherein the performance is measured according to a defined performance criterion, receiving performance values for requested performance characteristics of the performance of the communication traffic flow via a first interface, and based on an adjustment value of the performance values, adjusting, via a second interface, a buffer parameter of the group of buffer parameters.

20 Claims, 10 Drawing Sheets

(56) References Cited

OTHER PUBLICATIONS

Dong et al., "PCC: Re-architecting congestion control for consistent high performance." In NSDI, pp. 395-408, Oakland, CA, May 2015. USENIX Association. 14 pages.
Arun et al., "Practical delay-based congestion control for the internet." In 15th USENIX Symposium on Networked Systems Design and Implementation (NSDI) (2018), USENIX Association. 15 pages.
Sivaraman et al., "No silver bullet: Extending SDN to the data plane," in Twelfth ACM Workshop on Hot Topics in Networks (HotNets-XII), College Park, MD, Nov. 2013. 7 pages.

* cited by examiner

FLEXIBLE BUFFER MANAGEMENT FOR OPTIMIZING CONGESTION CONTROL USING RADIO ACCESS NETWORK INTELLIGENT CONTROLLER FOR 5G OR OTHER NEXT GENERATION WIRELESS NETWORK

TECHNICAL FIELD

This disclosure relates generally to buffer management. More specifically, facilitating flexible buffer management for optimizing congestion control using radio access network (RAN) intelligent controller, e.g., for 5th generation (5G) or other next generation wireless network.

BACKGROUND 5G wireless systems represent a next major phase of mobile telecommunications standards beyond the current telecommunications standards of $4^{th}$ generation (4G). In addition to faster peak Internet connection speeds, 5G planning aims at higher capacity than current 4G, allowing a higher number of mobile broadband users per area unit, and allowing consumption of higher or unlimited data quantities. This would enable a large portion of the population to stream high-definition media many hours per day with their mobile devices, when out of reach of wireless fidelity hotspots. 5G research and development also aims at improved support of machine-to-machine communication, also known as the Internet of Things, aiming at lower cost, lower battery consumption, and lower latency than 4G equipment. Latency over RAN is a major factor that affects the end-to-end latency and performance over applications over cellular networks. The upcoming 5G networks promise high throughput and low latency radio access through mmWave radio, flexible RAN, and edge clouds. However, a key factor that affects throughput and latency of applications besides the RAN is application-layer congestion control working in tandem with the RAN. Traditional flavors of transmission control protocol (TCP) don't perform well under varying radio link qualities, congestion, and buffering at the network node devices. There are several congestion control algorithms that aim to overcome problems with traditional flavors of TCP. Most of these algorithms treat the underlying network as a black box and aim to maximize an underlying utility function to maximize throughput and/or reduce latency.

The above-described background relating to relating to latency in the 5G communication system, is merely intended to provide a contextual overview of some current issues, and is not intended to be exhaustive (e.g., although problems and solution are directed to next generation networks such as 5G, the solutions can be applied to 4G/LTE technologies). Other contextual information may become further apparent upon review of the following detailed description.

BRIEF DESCRIPTION OF THE DRAWINGS

Non-limiting and non-exhaustive embodiments of the subject disclosure are described with reference to the following figures, wherein like reference numerals refer to like parts throughout the various views unless otherwise specified.

DETAILED DESCRIPTION

Figure 1:
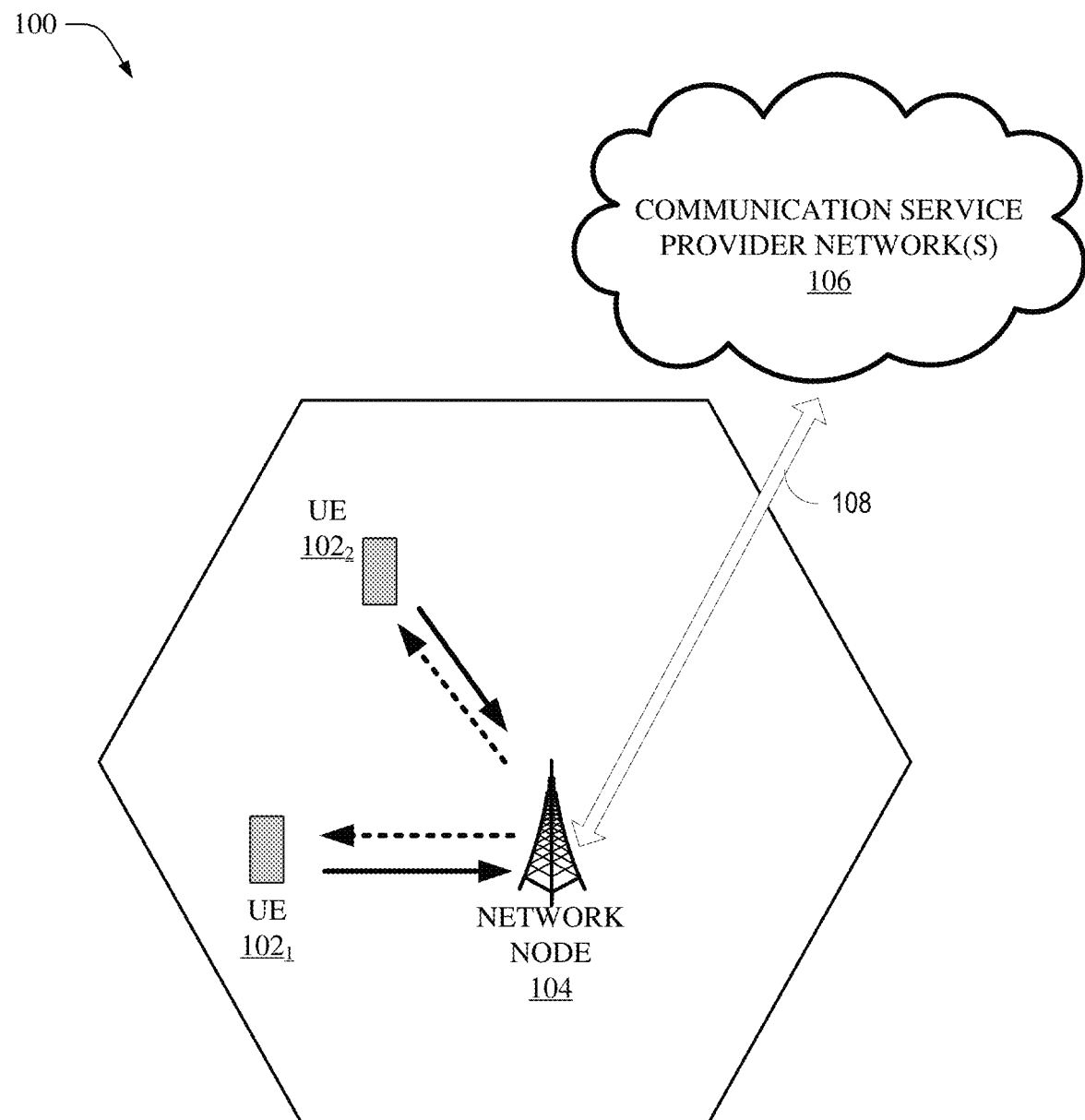
FIG. 1 illustrates an example wireless communication system in which a network node device and user equipment (UE) can implement various aspects and embodiments of the subject disclosure.

In the following description, numerous specific details are set forth to provide a thorough understanding of various embodiments. One skilled in the relevant art will recognize, however, that the techniques described herein can be practiced without one or more of the specific details, or with other methods, components, materials, etc. In other instances, well-known structures, materials, or operations are not shown or described in detail to avoid obscuring certain aspects.

Reference throughout this specification to "one embodiment," or "an embodiment," means that a particular feature, structure, or characteristic described in connection with the embodiment is included in at least one embodiment. Thus, the appearances of the phrase "in one embodiment," "in one aspect," or "in an embodiment," in various places throughout this specification are not necessarily all referring to the same embodiment. Furthermore, the particular features, structures, or characteristics may be combined in any suitable manner in one or more embodiments.

As utilized herein, terms "component," "system," "interface," and the like are intended to refer to a computer-related entity, hardware, software (e.g., in execution), and/or firmware. For example, a component can be a processor, a process running on a processor, an object, an executable, a program, a storage device, and/or a computer. By way of illustration, an application running on a server and the server can be a component. One or more components can reside within a process, and a component can be localized on one computer and/or distributed between two or more computers.

Further, these components can execute from various machine-readable media having various data structures stored thereon. The components can communicate via local and/or remote processes such as in accordance with a signal having one or more data packets (e.g., data from one component interacting with another component in a local system, distributed system, and/or across a network, e.g., the Internet, a local area network, a wide area network, etc. with other systems via the signal).

As another example, a component can be an apparatus with specific functionality provided by mechanical parts operated by electric or electronic circuitry; the electric or electronic circuitry can be operated by a software application or a firmware application executed by one or more processors; the one or more processors can be internal or external to the apparatus and can execute at least a part of the software or firmware application. As yet another example, a component can be an apparatus that provides specific functionality through electronic components without mechanical parts; the electronic components can include one or more processors therein to execute software and/or firmware that confer(s), at least in part, the functionality of the electronic components. In an aspect, a component can emulate an electronic component via a virtual machine, e.g., within a cloud computing system.

The words "exemplary" and/or "demonstrative" are used herein to mean serving as an example, instance, or illustration. For the avoidance of doubt, the subject matter disclosed herein is not limited by such examples. In addition, any aspect or design described herein as "exemplary" and/or "demonstrative" is not necessarily to be construed as preferred or advantageous over other aspects or designs, nor is it meant to preclude equivalent exemplary structures and techniques known to those of ordinary skill in the art. Furthermore, to the extent that the terms "includes," "has," "contains," and other similar words are used in either the detailed description or the claims, such terms are intended to be inclusive—in a manner similar to the term "comprising" as an open transition word—without precluding any additional or other elements.

As used herein, the term "infer" or "inference" refers generally to the process of reasoning about, or inferring states of, the system, environment, user, and/or intent from a set of observations as captured via events and/or data. Captured data and events can include user data, device data, environment data, data from sensors, sensor data, application data, implicit data, explicit data, etc. Inference can be employed to identify a specific context or action, or can generate a probability distribution over states of interest based on a consideration of data and events, for example.

Inference can also refer to techniques employed for composing higher-level events from a set of events and/or data. Such inference results in the construction of new events or actions from a set of observed events and/or stored event data, whether the events are correlated in close temporal proximity, and whether the events and data come from one or several event and data sources. Various classification schemes and/or systems (e.g., support vector machines, neural networks, expert systems, Bayesian belief networks, fuzzy logic, and data fusion engines) can be employed in connection with performing automatic and/or inferred action in connection with the disclosed subject matter.

In addition, the disclosed subject matter can be implemented as a method, apparatus, or article of manufacture using standard programming and/or engineering techniques to produce software, firmware, hardware, or any combination thereof to control a computer to implement the disclosed subject matter. The term "article of manufacture" as used herein is intended to encompass a computer program accessible from any computer-readable device, machine-readable device, computer-readable carrier, computer-readable media, or machine-readable media. For example, computer-readable media can include, but are not limited to, a magnetic storage device, e.g., hard disk; floppy disk; magnetic strip(s); an optical disk (e.g., compact disk (CD), a digital video disc (DVD), a Blu-ray Disc™ (BD)); a smart card; a flash memory device (e.g., card, stick, key drive); and/or a virtual device that emulates a storage device and/or any of the above computer-readable media.

As an overview, various embodiments are described herein to facilitate flexible buffer management for optimizing congestion control using radio access network (RAN) intelligent controller. For simplicity of explanation, the methods (or algorithms) are depicted and described as a series of acts. It is to be understood and appreciated that the various embodiments are not limited by the acts illustrated and/or by the order of acts. For example, acts can occur in various orders and/or concurrently, and with other acts not presented or described herein. Furthermore, not all illustrated acts may be required to implement the methods. In addition, the methods could alternatively be represented as a series of interrelated states via a state diagram or events. Additionally, the methods described hereafter are capable of being stored on an article of manufacture (e.g., a machine-readable storage medium) to facilitate transporting and transferring such methodologies to computers. The term article of manufacture, as used herein, is intended to encompass a computer program accessible from any computer-readable device, carrier, or media, including a non-transitory machine-readable storage medium.

It should be noted that although various aspects and embodiments have been described herein in the context of 5G, Universal Mobile Telecommunications System (UMTS), and/or Long-Term Evolution (LTE), or other next generation networks, the disclosed aspects are not limited to 5G, a UMTS implementation, and/or an LTE implementation as the techniques can also be applied in 3G, 4G or LTE systems. For example, aspects or features of the disclosed embodiments can be exploited in substantially any wireless communication technology. Such wireless communication technologies can include UMTS, Code Division Multiple Access (CDMA), Wi-Fi, Worldwide Interoperability for Microwave Access (WiMAX), General Packet Radio Service (GPRS), Enhanced GPRS, Third Generation Partnership Project (3GPP), LTE, Third Generation Partnership Project 2 (3GPP2) Ultra Mobile Broadband (UMB), High Speed Packet Access (HSPA), Evolved High Speed Packet Access (HSPA+), High-Speed Downlink Packet Access (HSDPA), High-Speed Uplink Packet Access (HSUPA), Zigbee, or another IEEE 802.XX technology. Additionally, substantially all aspects disclosed herein can be exploited in legacy telecommunication technologies.

Described herein are systems, methods, articles of manufacture, and other embodiments or implementations that can facilitate dynamic reconfiguration of 5G backhaul connection upon detecting a connection failure. Facilitating dynamic reconfiguration of 5G backhaul connection can be implemented in connection with any type of device with a connection to the communications network (e.g., a mobile handset, a computer, a handheld device, etc.) any Internet of Things (IoT) device (e.g., toaster, coffee maker, blinds, music players, speakers, etc.), and/or any connected vehicles (cars, airplanes, space rockets, and/or other at least partially automated vehicles (e.g., drones)). In some embodiments the non-limiting term user equipment (UE) is used. It can refer to any type of wireless device that communicates with a radio network node in a cellular or mobile communication system. Examples of UE are target device, device to device (D2D) UE, machine type UE or UE capable of machine to machine (M2M) communication, PDA, Tablet, mobile terminals, smart phone, laptop embedded equipped (LEE), laptop mounted equipment (LME), USB dongles, etc. Note that the terms element, elements and antenna ports can be interchangeably used but carry the same meaning in this disclosure. The embodiments are applicable to single carrier as well as to multicarrier (MC) or carrier aggregation (CA) operation of the UE. The term carrier aggregation (CA) is also called (e.g., interchangeably called) "multi-carrier system", "multi-cell operation", "multi-carrier operation", "multi-carrier" transmission and/or reception.

In some embodiments the non-limiting term radio, network node device, or simply network node is used. It can refer to any type of network node that serves UE is connected to other network nodes or network elements or any radio node from where UE receives a signal. Examples of radio network nodes are Node B, base station (BS), multi-standard radio (MSR) node such as MSR BS, evolved Node B (eNB), next generation Node B (gNB), network controller, radio network controller (RNC), base station controller (BSC), relay, donor node controlling relay, base transceiver station (BTS), access point (AP), transmission points, transmission nodes, remote radio unit (RRU), remote radio head (RRH), nodes in distributed antenna system (DAS), relay device, network node, node device, etc.

Cloud radio access networks (RAN) can enable the implementation of concepts such as software-defined network (SDN) and network function virtualization (NFV) in 5G networks. This disclosure can facilitate a generic channel state information framework design for a 5G network. Certain embodiments of this disclosure can comprise an SDN controller that can control routing of traffic within the network and between the network and traffic destinations. The SDN controller can be merged with the 5G network architecture to enable service deliveries via open application programming interfaces ("APIs") and move the network core towards an all internet protocol ("IP"), cloud based, and software driven telecommunications network. The SDN controller can work with or take the place of policy and charging rules function ("PCRF") network elements so that policies such as quality of service and traffic management and routing can be synchronized and managed end to end.

The RAN Intelligent Controller (RIC) is a flexible platform that allows control of RAN on a per UE (User Equipment) basis with very low latency (20 ms). A typical RIC deployment will control a few hundred eNBs or gNBs. The RIC will allow developers to deploy their own applications (e.g., xApps) to optimize the RAN for different use cases such as load balancing, dual connectivity etc. Through such RAN optimization, a key expectation for RIC is to enable high throughput, low-latency applications. In some embodiments, the RIC can influence congestion control at the servers, is by sending information such as radio resource availability, eNB buffer status, UE channel quality directly to the server. The server can then directly use this information to take appropriate congestion control action.

All congestion control algorithms rely on measurements such as packet drop rates, RTT (round trip time), or a congestion marker such as ECN to make control decisions. According an embodiments, an intelligent buffer management through the RIC is used to influence the behavior of congestion control algorithms. Existing eNBs typically use deep buffers at the data plane where each bearer is allocated its own buffer. This approach prioritizes using all available radio transmission opportunities by keeping the transmission buffer full and has worked well so far for web-browsing and video traffic. Dynamically adjusting the queueing and scheduling policy at the eNB (e.g., changing buffer size, pro-actively dropping packets, or changing ECN marking threshold) can have a big impact on application performance. In some embodiments, the algorithm utilizes the RIC flexibly to control the queuing/scheduling policy for a buffer. The RIC can switch between queuing schemes, scheduling policies, or drop packets depending on the set of data plane techniques available at the eNB/gNB. The queueing schemes do not need to be available at the hardware stack of the eNB/gNB but rather can be placed as small programmable hardware modules in front of the actual bearer-specific queues. An eNB/gNB buffer management xApp running on the RIC will monitor the RAN and the flow performance and dynamically tune the available policies through the E2 interface. The xApp will run the algorithm to optimize the application performance. The per-flow requirements of throughput, latency, or application burst characteristics are communicated to the xAPP through the A1 interface to the RIC. In some embodiments, the RIC performs these optimizations not at a per-packet but at the order of tens of milliseconds to hundreds of milliseconds. This time horizon is long enough to get aggregate RAN statistics to the RIC and short enough such that the RIC can monitor any bursts in traffic and ensure low latency (order of tens of milliseconds).

According to some embodiments, the buffer management will improve latency over handovers. During a handover, the eNB buffer is migrated from the source eNB to the target eNB over the X2 interface. The buffer management xApp can leverage techniques such as handover prediction to pro-actively limit the buffer size when a handover is imminent. This will reduce data-plane latency and core traffic on the mobile operator's network.

According to some embodiments, the buffer control algorithm measures the throughput and per-packet delay of each flow. The algorithm periodically performs small experiments by changing the buffer sizes or queuing policy at a flow. Tuning the scheduling algorithm is performed at a slower time scale. The results of these experiments will be evaluated to see if the flow meets its performance requirements of throughput and latency. Using an online learning technique, the algorithm can explore the state space and arrive at the optimal solution for each flow.

According an embodiment, a system can comprise a processor and a memory that stores executable instructions that, when executed by the processor, facilitate performance of operations comprising monitoring a performance of a communication traffic flow using a group of buffer parameters of a network node device of a wireless network, wherein the performance is measured according to a defined performance criterion. The system can further facilitate receiving performance values for requested performance characteristics of the performance of the communication traffic flow via a first interface. The system can further facilitate based on an adjustment value of the performance values, adjusting, via a second interface, a buffer parameter of the group of buffer parameters.

According to another embodiment, described herein is a method that can comprise monitoring, by a device comprising a processor, a communication traffic flow performance using a group of buffer parameters of a network node device of a wireless network. The method can further comprise receiving, by the device, required performance characteristics of the communication traffic flow performance via an interface. The method can further comprise based on performance values, adjusting, by the device, a buffer parameter of a network node device of the wireless network based on an adjustment value.

According to yet another embodiment, a device can comprise a processor and a memory that stores executable instructions that, when executed by the processor, facilitate performance of operations comprising monitoring a performance of a flow of communication traffic using a group of communication parameters of a network node. The device can further comprise receiving, via a first interface, requested performance characteristics of the performance of the flow of the communication traffic. The device can further comprise based on an adjustment value of the performance values, adjusting, via a second interface, a communication parameter of the group of communication parameters.

These and other embodiments or implementations are described in more detail below with reference to the drawings. Repetitive description of like elements employed in the figures and other embodiments described herein is omitted for sake of brevity.

FIG. 1 illustrates a non-limiting example of a wireless communication system 100 in accordance with various aspects and embodiments of the subject disclosure. In one or more embodiments, system 100 can comprise one or more user equipment UEs 102. The non-limiting term user equipment can refer to any type of device that can communicate with a network node in a cellular or mobile communication system. A UE can have one or more antenna panels having vertical and horizontal elements. Examples of a UE comprise a target device, device to device (D2D) UE, machine type UE or UE capable of machine to machine (M2M) communications, personal digital assistant (PDA), tablet, mobile terminals, smart phone, laptop mounted equipment (LME), universal serial bus (USB) dongles enabled for mobile communications, a computer having mobile capabilities, a mobile device such as cellular phone, a laptop having laptop embedded equipment (LEE, such as a mobile broadband adapter), a tablet computer having a mobile broadband adapter, a wearable device, a virtual reality (VR) device, a heads-up display (HUD) device, a smart car, a machine-type communication (MTC) device, and the like. User equipment UE 102 can also comprise IOT devices that communicate wirelessly.

In various embodiments, system 100 is or comprises a wireless communication network serviced by one or more wireless communication network providers. In example embodiments, a UE 102 can be communicatively coupled to the wireless communication network via a network node 104. The network node (e.g., network node device) can communicate with user equipment (UE), thus providing connectivity between the UE and the wider cellular network. The UE 102 can send transmission type recommendation data to the network node 104. The transmission type recommendation data can comprise a recommendation to transmit data via a closed loop MIMO mode and/or a rank-1 precoder mode.

A network node can have a cabinet and other protected enclosures, an antenna mast, and multiple antennas for performing various transmission operations (e.g., MIMO operations). Network nodes can serve several cells, also called sectors, depending on the configuration and type of antenna. In example embodiments, the UE 102 can send and/or receive communication data via a wireless link to the network node 104. The dashed arrow lines from the network node 104 to the UE 102 represent downlink (DL) communications and the solid arrow lines from the UE 102 to the network nodes 104 represents an uplink (UL) communication.

System 100 can further include one or more communication service provider networks 106 that facilitate providing wireless communication services to various UEs, including UE 102, via the network node 104 and/or various additional network devices (not shown) included in the one or more communication service provider networks 106. The one or more communication service provider networks 106 can include various types of disparate networks, including but not limited to: cellular networks, femto networks, picocell networks, microcell networks, internet protocol (IP) networks Wi-Fi service networks, broadband service network, enterprise networks, cloud based networks, millimeter wave networks and the like. For example, in at least one implementation, system 100 can be or include a large scale wireless communication network that spans various geographic areas. According to this implementation, the one or more communication service provider networks 106 can be or include the wireless communication network and/or various additional devices and components of the wireless communication network (e.g., additional network devices and cell, additional UEs, network server devices, etc.). The network node 104 can be connected to the one or more communication service provider networks 106 via one or more backhaul links 108. For example, the one or more backhaul links 108 can comprise wired link components, such as a T1/E1 phone line, a digital subscriber line (DSL) (e.g., either synchronous or asynchronous), an asymmetric DSL (ADSL), an optical fiber backbone, a coaxial cable, and the like. The one or more backhaul links 108 can also include wireless link components, such as but not limited to, line-of-sight (LOS) or non-LOS links which can include terrestrial air-interfaces or deep space links (e.g., satellite communication links for navigation).

Wireless communication system 100 can employ various cellular systems, technologies, and modulation modes to facilitate wireless radio communications between devices (e.g., the UE 102 and the network node 104). While example embodiments might be described for 5G new radio (NR) systems, the embodiments can be applicable to any radio access technology (RAT) or multi-RAT system where the UE operates using multiple carriers e.g. LTE FDD/TDD, GSM/GERAN, CDMA2000 etc.

For example, system 100 can operate in accordance with global system for mobile communications (GSM), universal mobile telecommunications service (UMTS), long term evolution (LTE), LTE frequency division duplexing (LTE FDD, LTE time division duplexing (TDD), high speed packet access (HSPA), code division multiple access (CDMA), wideband CDMA (WCMDA), CDMA2000, time division multiple access (TDMA), frequency division multiple access (FDMA), multi-carrier code division multiple access (MC-CDMA), single-carrier code division multiple access (SC-CDMA), single-carrier FDMA (SC-FDMA), orthogonal frequency division multiplexing (OFDM), discrete Fourier transform spread OFDM (DFT-spread OFDM) single carrier FDMA (SC-FDMA), Filter bank based multi-carrier (FBMC), zero tail DFT-spread-OFDM (ZT DFT-s-OFDM), generalized frequency division multiplexing (GFDM), fixed mobile convergence (FMC), universal fixed mobile convergence (UFMC), unique word OFDM (UW-OFDM), unique word DFT-spread OFDM (UW DFT-Spread-OFDM), cyclic prefix OFDM CP-OFDM, resource-block-filtered OFDM, Wi Fi, WLAN, WiMax, and the like. However, various features and functionalities of system 100 are particularly described wherein the devices (e.g., the UEs 102 and the network device 104) of system 100 are configured to communicate wireless signals using one or more multi carrier modulation schemes, wherein data symbols can be transmitted simultaneously over multiple frequency subcarriers (e.g., OFDM, CP-OFDM, DFT-spread OFMD, UFMC, FMBC, etc.). The embodiments are applicable to single carrier as well as to multicarrier (MC) or carrier aggregation (CA) operation of the UE. The term carrier aggregation (CA) is also called (e.g. interchangeably called) "multi-carrier system", "multi-cell operation", "multi-carrier operation", "multi-carrier" transmission and/or reception. Note that some embodiments are also applicable for Multi RAB (radio bearers) on some carriers (that is data plus speech is simultaneously scheduled).

In various embodiments, system 100 can be configured to provide and employ 5G wireless networking features and functionalities. 5G wireless communication networks are expected to fulfill the demand of exponentially increasing data traffic and to allow people and machines to enjoy gigabit data rates with virtually zero latency. Compared to 4G, 5G supports more diverse traffic scenarios. For example, in addition to the various types of data communication between conventional UEs (e.g., phones, smartphones, tablets, PCs, televisions, Internet enabled televisions, etc.) supported by 4G networks, 5G networks can be employed to support data communication between smart cars in association with driverless car environments, as well as machine type communications (MTCs). Considering the drastic different communication needs of these different traffic scenarios, the ability to dynamically configure waveform parameters based on traffic scenarios while retaining the benefits of multi carrier modulation schemes (e.g., OFDM and related schemes) can provide a significant contribution to the high speed/capacity and low latency demands of 5G networks. With waveforms that split the bandwidth into several sub-bands, different types of services can be accommodated in different sub-bands with the most suitable waveform and numerology, leading to an improved spectrum utilization for 5G networks.

To meet the demand for data centric applications, features of proposed 5G networks may comprise: increased peak bit rate (e.g., 20 Gbps), larger data volume per unit area (e.g., high system spectral efficiency—for example about 3.5 times that of spectral efficiency of long term evolution (LTE) systems), high capacity that allows more device connectivity both concurrently and instantaneously, lower battery/power consumption (which reduces energy and consumption costs), better connectivity regardless of the geographic region in which a user is located, a larger numbers of devices, lower infrastructural development costs, and higher reliability of the communications. Thus, 5G networks may allow for: data rates of several tens of megabits per second should be supported for tens of thousands of users, 1 gigabit per second to be offered simultaneously to tens of workers on the same office floor, for example; several hundreds of thousands of simultaneous connections to be supported for massive sensor deployments; improved coverage, enhanced signaling efficiency; reduced latency compared to LTE.

The upcoming 5G access network may utilize higher frequencies (e.g., >6 GHz) to aid in increasing capacity. Currently, much of the millimeter wave (mmWave) spectrum, the band of spectrum between 30 GHz and 300 GHz is underutilized. The millimeter waves have shorter wavelengths that range from 10 millimeters to 1 millimeter, and these mmWave signals experience severe path loss, penetration loss, and fading. However, the shorter wavelength at mmWave frequencies also allows more antennas to be packed in the same physical dimension, which allows for large-scale spatial multiplexing and highly directional beamforming.

Performance can be improved if both the transmitter and the receiver are equipped with multiple antennas. Multi-antenna techniques can significantly increase the data rates and reliability of a wireless communication system. The use of multiple input multiple output (MIMO) techniques, which was introduced in the third-generation partnership project (3GPP) and has been in use (including with LTE), is a multi-antenna technique that can improve the spectral efficiency of transmissions, thereby significantly boosting the overall data carrying capacity of wireless systems. The use of multiple-input multiple-output (MIMO) techniques can improve mmWave communications, and has been widely recognized a potentially important component for access networks operating in higher frequencies. MIMO can be used for achieving diversity gain, spatial multiplexing gain and beamforming gain. For these reasons, MIMO systems are an important part of the 3rd and 4th generation wireless systems, and are planned for use in 5G systems.

Figure 2:
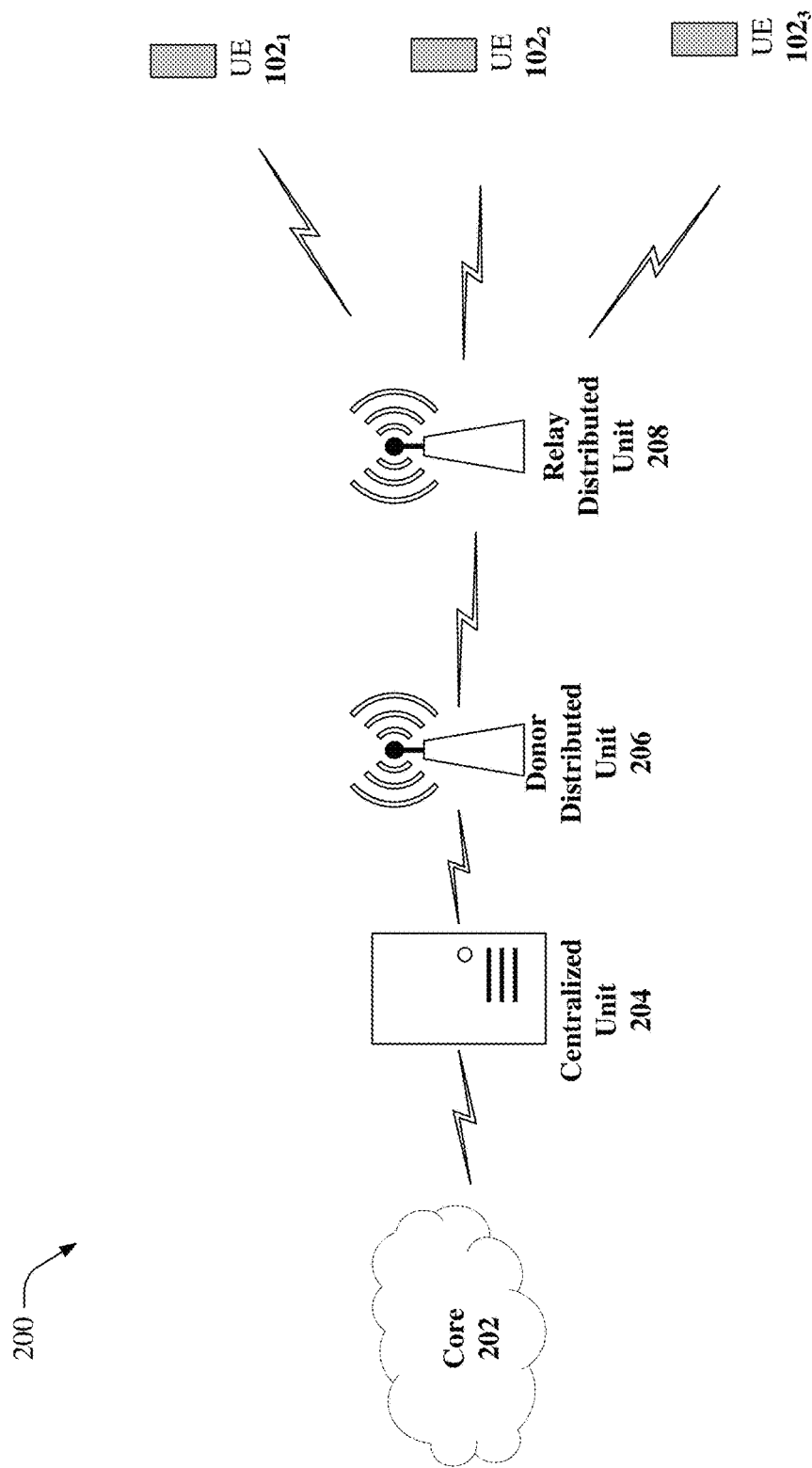
FIG. 2 illustrates an example schematic system block diagram of integrated access and backhaul links according to one or more embodiments.

Referring now to FIG. 2, illustrated is an example schematic system block diagram of integrated access and backhaul links according to one or more embodiments. For example, the network 200, as represented in FIG. 2 with integrated access and backhaul links, can allow a relay node to multiplex access and backhaul links in time, frequency, and/or space (e.g. beam-based operation). Thus, FIG. 2 illustrates a generic IAB set-up comprising a core network 202, a centralized unit 204, a donor distributed unit 206, a relay distributed unit 208, and UEs 1021, 1022, 1023. The donor distributed unit 206 (e.g., access point) can have a wired backhaul with a protocol stack and can relay the user traffic for the UEs 1021, 1022, 1023 across the IAB and backhaul link. Then the relay distributed unit 208 can take the backhaul link and convert it into different strains for the connected UEs 1021, 1022, 1023. Although FIG. 2 depicts a single hop (e.g., over the air), it should be noted that multiple backhaul hops can occur in other embodiments.

The relays can have the same type of distributed unit structure that the gNode B has. For 5G, the protocol stack can be split, where some of the stack is centralized. For example, the PDCP layer and above can be at the centralized unit 204, but in a real time application part of the protocol stack, the radio link control (RLC), the medium access control (MAC), and the physical layer PHY can be co-located with the base station wherein the system can comprise an F1 interface. In order to add relaying, the F1 interface can be wireless so that the same structure of the donor distributed unit 206 can be kept.

Figure 3:
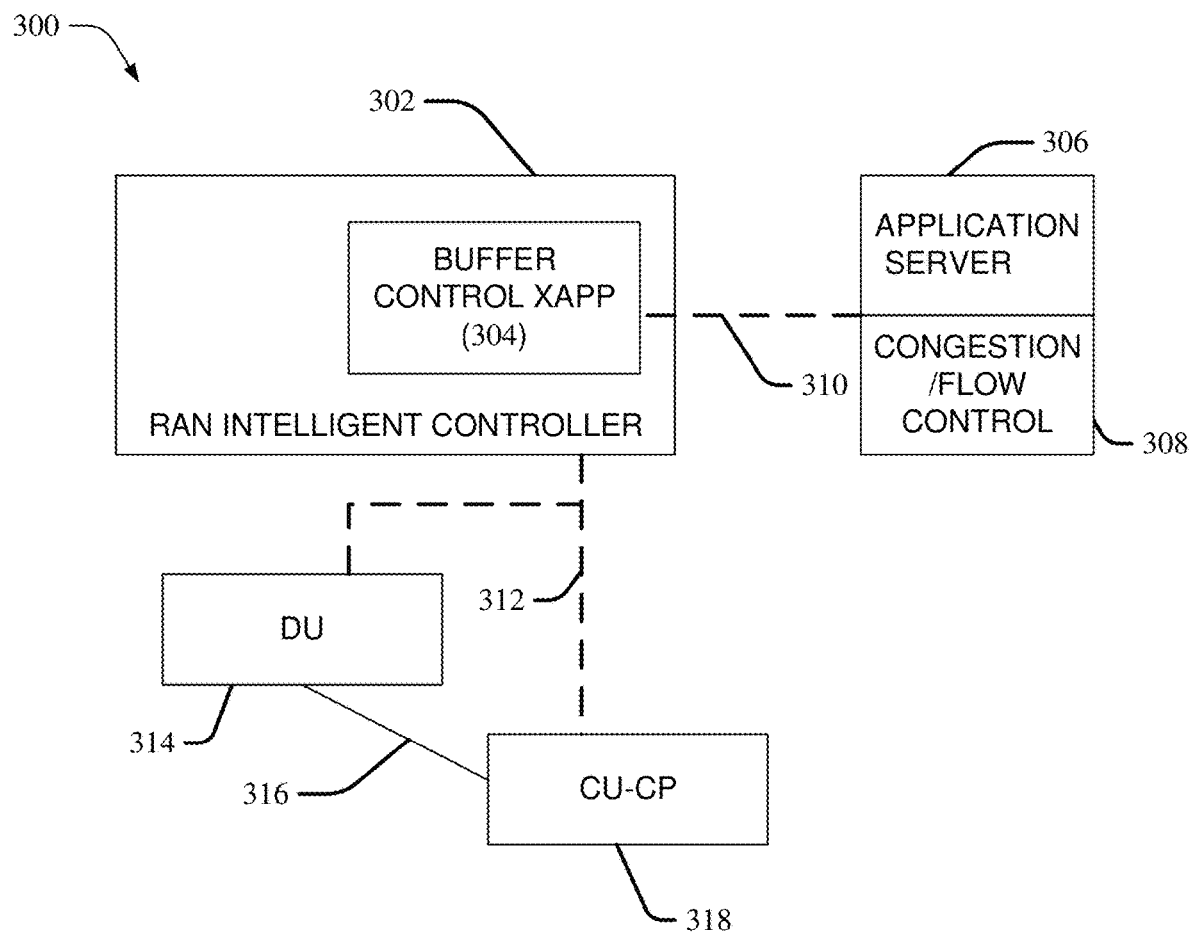
FIG. 3 illustrates an example of RAN network architecture in accordance with various aspects and embodiments described herein.

Referring now to FIG. 3, illustrated is an example of RAN network architecture 300 in accordance with various aspects and embodiments described herein. The network architecture 300 comprises a RAN intelligent controller 302 (RIC) having a buffer control application 304 (e.g., xAPP). The buffer control application 304 is communicatively connected to an application server 306 and congestion/flow control 308 via an A1 interface 310. The A1 interface 310 allows network management applications in RIC 302, also referred to as RIC near-real time (RT), to receive highly reliable data in a standardized format. For example, messages generated from artificial intelligent-enabled policies and machine-learning based training models can be conveyed to RIC 302. The core algorithm of RIC 302 can be developed and owned by operators. It provides the capability to modify the RAN behaviors by deployment of different models optimized to individual operator policies and optimization objectives.

In some embodiments, a distributed unit (DU) 314 and a central unit user plane (CU-UP) 318 has been specified by 3GPP. The DU 314 is communicatively connected to CU-UP) 318 via an application data link 316. The buffers for DU and CU-UP can be controlled by the RIC 302 via a E2 interface 312. The E2 interface 312 feeds data, including various RAN measurements, to the RIC 302 to facilitate radio resource management, it is also the interface through which the RIC near-RT 302 may initiate configuration commands directly to DU and CU-UP (e.g., to request adjustments to buffer size). Each individual functional entities DU and CU-UP may be placed at different physical locations according to operator requirements.

In some embodiments, a buffer management xApp 304 running on the RIC will monitor the RAN and the flow performance and dynamically tune the available policies through the E2 interface 312. The xApp 302 will run an algorithm to optimize the application performance. The per-flow requirements of throughput, latency, or application burst characteristics are communicated to the xAPP 304 through the A1 interface 310 the RIC 302. In some embodiments, The RIC 302 can perform these optimizations, not at a per-packet but, at the order of tens of milliseconds to hundreds of milliseconds. This time horizon is long enough to get aggregate RAN statistics to the RIC 302 and short enough such that the RIC 302 can monitor any bursts in traffic and ensure low latency (order of tens of milliseconds).

Figure 4:
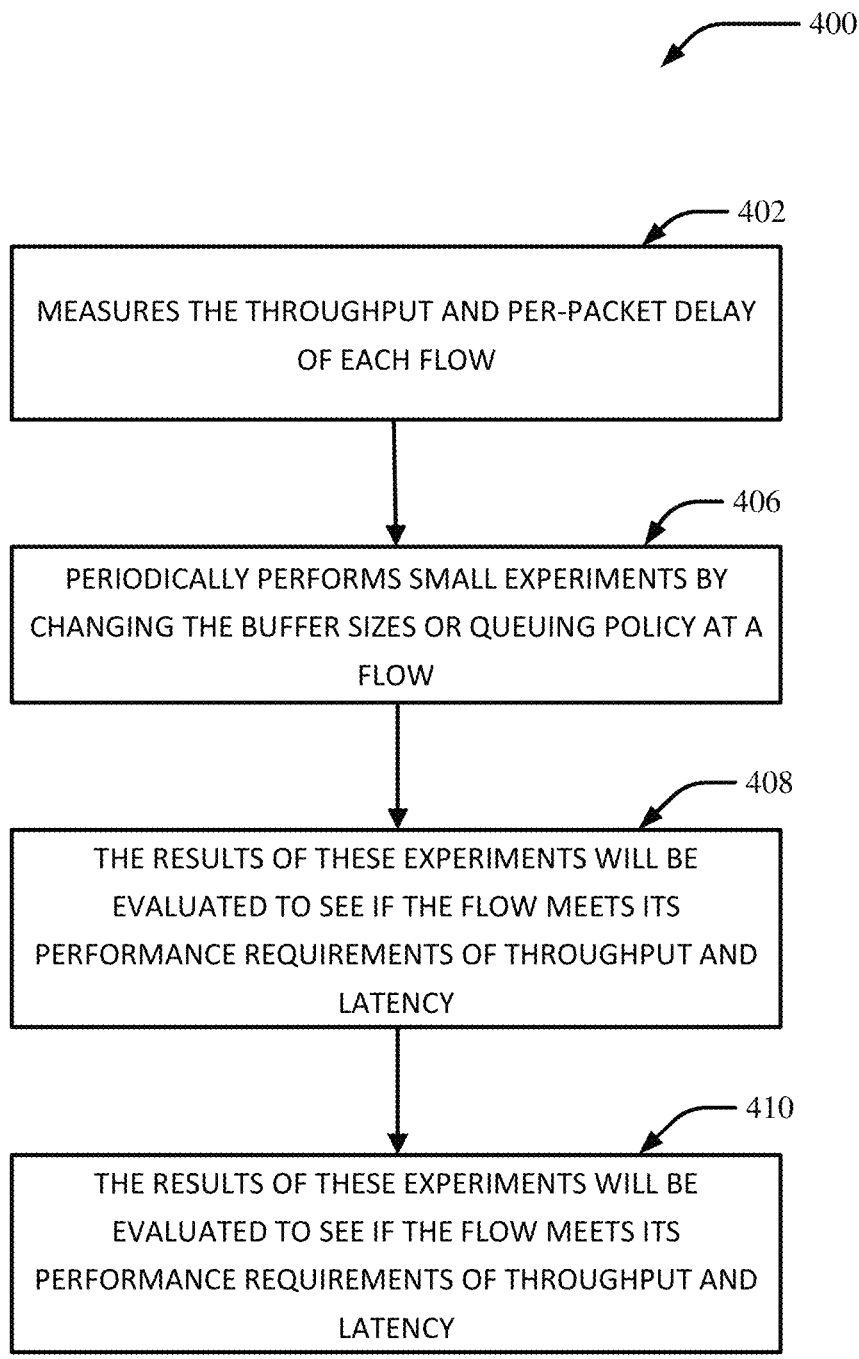
FIG. 4 illustrates an example of a buffer control algorithm that can facilitate optimizing congestion control using radio access network (RAN) intelligent controller in accordance with various aspects and embodiments described herein.

Referring now to FIG. 4, illustrated is an example of a buffer control algorithm 400 that can facilitate optimizing congestion control using radio access network (RAN) intelligent controller in accordance with various aspects and embodiments described herein. The buffer control algorithm is deployed in the RIC 302. Deploying the algorithm at RIC is beneficial since RIC provides a flexible way to monitor per UE performance and manage RAN parameters. The RIC also has knowledge of all flows through an eNB/gNB to make globally optimal decisions. At operation 402, the buffer control algorithm measures the throughput and per-packet delay of each flow. At operation 404, the buffer control algorithm periodically performs small experiments by changing the buffer sizes or queuing policy at a flow. At operation 406, the results of these experiments will be evaluated to see if the flow meets its performance requirements of throughput and latency. At operation 410, based on meeting the performance requirements and using various machine learning techniques, the algorithm can explore the state space and arrive at the optimal solution for each flow to make any adjustments.

Figure 5:
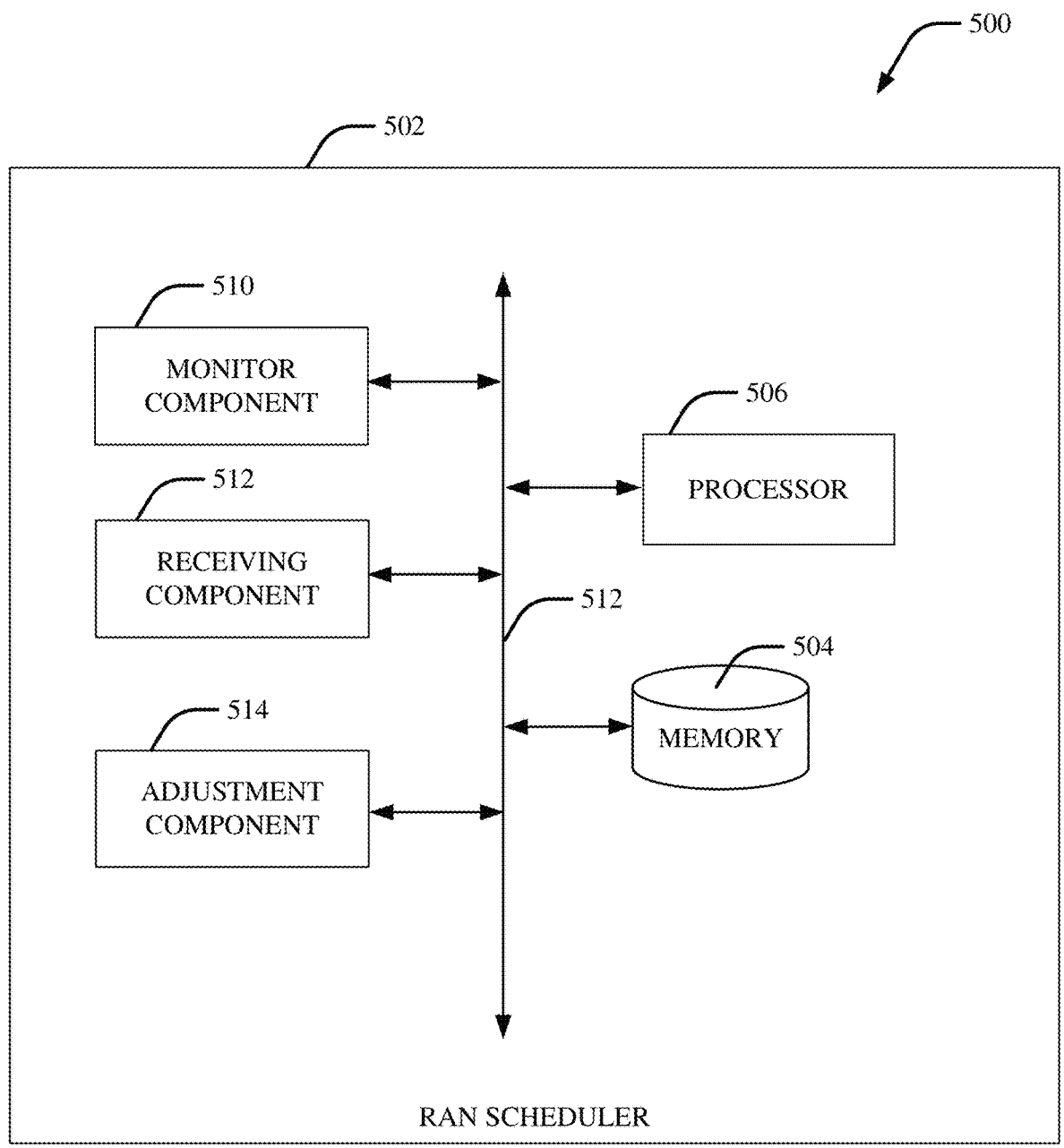
FIG. 5 illustrates a block diagram of an example, non-limiting system that facilitates flexible buffer management for optimizing congestion control using radio access network (RAN) intelligent controller in accordance with one or more embodiments described herein.

FIG. 5 illustrates a block diagram of an example, non-limiting system 500 that facilitates flexible buffer management for optimizing congestion control using radio access network (RAN) intelligent controller in accordance with one or more embodiments described herein. Repetitive description of like elements employed in respective embodiments is omitted for sake of brevity. According to some embodiments, the system 500 can comprise a small cell having a RAN scheduler 502. In some embodiments, the RAN scheduler 502 can also include or otherwise be associated with a memory 504, a processor 506 that executes computer executable components stored in a memory 504. The RAN scheduler 502 can further include a system bus 508 that can couple various components including, but not limited to, a monitor component 510, a receiving component 512, and a adjustment component 514.

Aspects of systems (e.g., the RAN scheduler 502 and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described.

It should be appreciated that the embodiments of the subject disclosure depicted in various figures disclosed herein are for illustration only, and as such, the architecture of such embodiments are not limited to the systems, devices, and/or components depicted therein. For example, in some embodiments, the RAN scheduler 502 can comprise various computer and/or computing-based elements described herein with reference to operating environment 1000 and FIG. 10. In several embodiments, such computer and/or computing-based elements can be used in connection with implementing one or more of the systems, devices, and/or components shown and described in connection with FIG. 5 or other figures disclosed herein.

According to several embodiments, the memory 504 can store one or more computer and/or machine readable, writable, and/or executable components and/or instructions that, when executed by processor 506, can facilitate performance of operations defined by the executable component(s) and/or instruction(s). For example, the memory 504 can store computer and/or machine readable, writable, and/or executable components and/or instructions that, when executed by the processor 506, can facilitate execution of the various functions described herein relating to the monitor component 510, the receiving component 512, and the adjustment component 514.

In several embodiments, the memory 504 can comprise volatile memory (e.g., random access memory (RAM), static RAM (SRAM), dynamic RAM (DRAM), etc.) and/or non-volatile memory (e.g., read only memory (ROM), programmable ROM (PROM), electrically programmable ROM (EPROM), electrically erasable programmable ROM (EEPROM), etc.) that can employ one or more memory architectures. Further examples of memory 504 are described below with reference to system memory 1006 and FIG. 10. Such examples of memory 504 can be employed to implement any embodiments of the subject disclosure.

According to some embodiments, the processor 506 can comprise one or more types of processors and/or electronic circuitry that can implement one or more computer and/or machine readable, writable, and/or executable components and/or instructions that can be stored on the memory 504. For example, the processor 506 can perform various operations that can be specified by such computer and/or machine readable, writable, and/or executable components and/or instructions including, but not limited to, logic, control, input/output (I/O), arithmetic, and/or the like. In some embodiments, processor 506 can comprise one or more central processing unit, multi-core processor, microprocessor, dual microprocessors, microcontroller, System on a Chip (SOC), array processor, vector processor, and/or another type of processor.

In some embodiments, the processor 506, the memory 504, the monitor component 510, the receiving component 512, and the adjustment component 514 can be communicatively, electrically, and/or operatively coupled to one another via the system bus 508 to perform functions of the RAN scheduler 502, and/or any components coupled therewith. In several embodiments, the system bus 508 can comprise one or more memory bus, memory controller, peripheral bus, external bus, local bus, and/or another type of bus that can employ various bus architectures.

In several embodiments, the RAN scheduler 502 can comprise one or more computer and/or machine readable, writable, and/or executable components and/or instructions that, when executed by the processor 506, can facilitate performance of operations defined by such component(s) and/or instruction(s). Further, in numerous embodiments, any component associated with the RAN scheduler 502, as described herein with or without reference to the various figures of the subject disclosure, can comprise one or more computer and/or machine readable, writable, and/or executable components and/or instructions that, when executed by the processor 506, can facilitate performance of operations defined by such component(s) and/or instruction(s). For example, the monitor component 510, and/or any other components associated with the RAN scheduler 502 (e.g., communicatively, electronically, and/or operatively coupled with and/or employed by RAN scheduler 502), can comprise such computer and/or machine readable, writable, and/or executable component(s) and/or instruction(s). Consequently, according to numerous embodiments, the RAN scheduler 502 and/or any components associated therewith, can employ the processor 506 to execute such computer and/or machine readable, writable, and/or executable component(s) and/or instruction(s) to facilitate performance of one or more operations described herein with reference to the RAN scheduler 502 and/or any such components associated therewith.

In some embodiments, the RAN scheduler 502 can facilitate performance of operations related to and/or executed by the components of RAN scheduler 502, for example, the processor 506, the memory 504, the monitor component 510, the receiving component 512, and the adjustment component 514. For example, as described in detail below, the RAN scheduler 502 can facilitate: monitoring (e.g., by the monitor component 510) a performance of a communication traffic flow using a group of buffer parameters of a network node; receiving (e.g., the receiving component 512) performance values for requested performance characteristics of the performance of the communication traffic flow via a first interface; and based on performance values, adjusting (e.g., by the adjusting component 514), via a second interface, a buffer parameter of the group of buffer parameters based on an adjustment value.

In some embodiments, the monitor component 510, can comprise one or more processors, memory, and electrical circuitry. The monitor component 510 monitors a communication traffic flow performance using a group of buffer parameters of a network node. In some embodiments, the eNB/gNB buffer management xApp running on the RIC will monitor the RAN and the flow performance and dynamically tune the available policies through the E2 interface. In some embodiments, the flow performance can be measured by packet drop rates, RTT (round trip time), or a congestion marker to make control decisions. The monitor component 510 can use an intelligent buffer management through the RIC to influence the behavior of congestion control algorithms.

In some embodiments, the receive component 512, can comprise one or more processors, memory, and electrical circuitry. In some embodiments, the receive component 512 can receive the required performance characteristics of the communication traffic flow performance via an interface. For example, the receive component 512 can receive the per-flow requirements of throughput, latency requirements, or application burst characteristics. These requirements can be communicated to the xAPP of the RIC through the A1 interface.

In some embodiments, the adjustment component 514, can comprise one or more processors, memory, and electrical circuitry. The adjustment component 514, based on performance values, adjusting a buffer parameter of a network device based on an adjustment value (e.g., value indicating how much the buffer size should be adjusted or data for how the policies should be changed). The xApp will run an algorithm to optimize the application performance (e.g., the algorithm can explore the state space and arrive at the optimal solution for each flow). The buffer control algorithm measures the throughput and per-packet delay of each flow. The algorithm periodically performs small experiments by adjusting the buffer sizes or queuing policy at a flow. Tuning the scheduling algorithm is performed at a slower time scale. The results of these experiments will be evaluated to see if the flow meets its performance requirements of throughput and latency.

Figure 6:
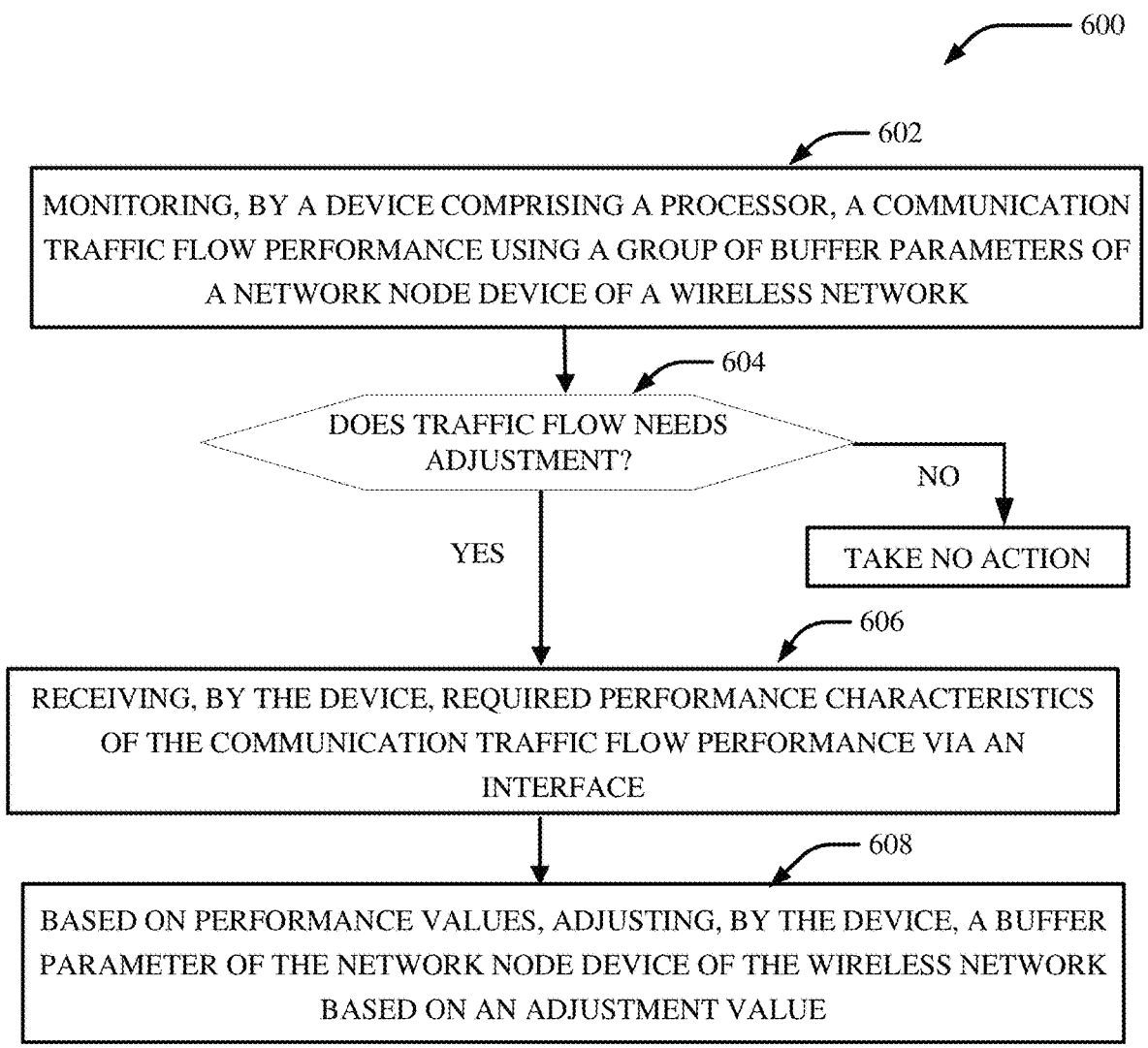
FIG. 6 depicts a diagram of an example, non-limiting computer implemented method that facilitates flexible buffer management for optimizing congestion control using radio access network (RAN) intelligent controller in accordance with one or more embodiments described herein.

FIG. 6 depicts a diagram of an example, non-limiting computer implemented method that facilitates flexible buffer management for optimizing congestion control using radio access network (RAN) intelligent controller in accordance with one or more embodiments described herein. In some examples, flow diagram 600 can be implemented by operating environment 1000 described below. It can be appreciated that the operations of flow diagram 600 can be implemented in a different order than is depicted.

In non-limiting example embodiments, a computing device (or system) (e.g., computer 1004) is provided, the device or system comprising one or more processors and one or more memories that stores executable instructions that, when executed by the one or more processors, can facilitate performance of the operations as described herein, including the non-limiting methods as illustrated in the flow diagrams of FIG. 6.

Operation 602 depicts monitoring, by a device comprising a processor, a communication traffic flow performance using a group of buffer parameters of a network node device of a wireless network. In some embodiments, the eNB/gNB buffer management xApp running on the RIC will monitor the RAN and the flow performance and dynamically tune the available policies through the E2 interface. Operation 604 depicts determining if the traffic flow needs adjustment. If the traffic flow needs adjustment, perform Operation 606. Otherwise, continue monitoring. Operation 606 depicts receiving, by the device, required performance characteristics of the communication traffic flow performance via an interface (e.g., the per-flow requirements of throughput, latency, or application burst characteristics are communicated to the xAPP of the RIC through the A1 interface). Operation 608 depicts based on performance values, adjusting, by the device, a buffer parameter of a network node device of the wireless network based on an adjustment value. The xApp will run an algorithm (described below) to optimize the application performance (e.g., the algorithm can explore the state space and arrive at the optimal solution for each flow). The buffer control algorithm measures the throughput and per-packet delay of each flow. The algorithm periodically performs small experiments by adjusting the buffer sizes or queuing policy at a flow. Tuning the scheduling algorithm is performed at a slower time scale. The results of these experiments will be evaluated to see if the flow meets its performance requirements of throughput and latency.

Figure 7:
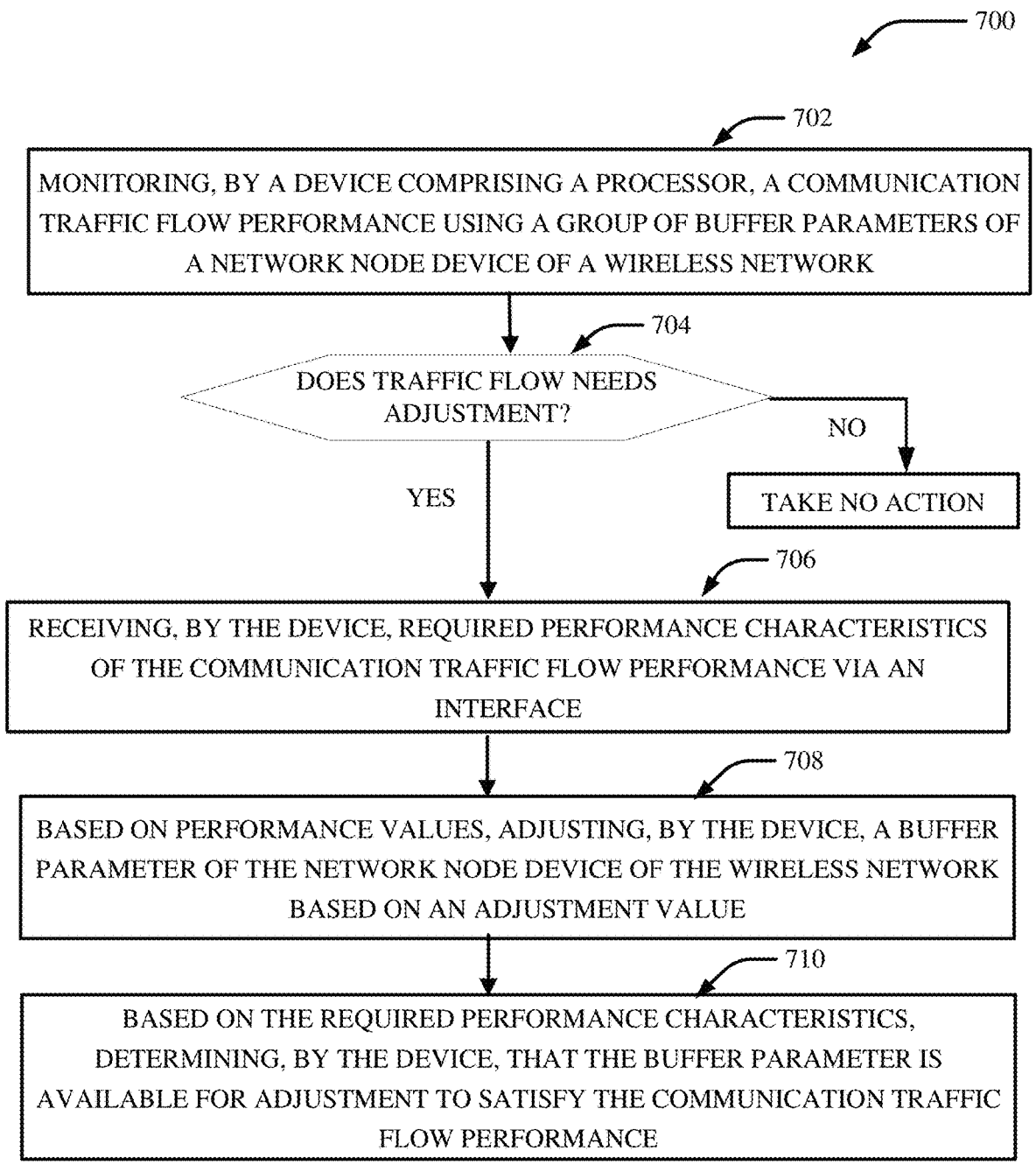
FIG. 7 depicts a diagram of an example, non-limiting computer implemented method that facilitates flexible buffer management for optimizing congestion control using radio access network (RAN) intelligent controller in accordance with one or more embodiments described herein.

FIG. 7 depicts a diagram of an example, non-limiting computer implemented method that facilitates flexible buffer management for optimizing congestion control using radio access network (RAN) intelligent controller in accordance with one or more embodiments described herein. In some examples, flow diagram 700 can be implemented by operating environment 1000 described below. It can be appreciated that the operations of flow diagram 700 can be implemented in a different order than is depicted.

In non-limiting example embodiments, a computing device (or system) (e.g., computer 1004) is provided, the device or system comprising one or more processors and one or more memories that stores executable instructions that, when executed by the one or more processors, can facilitate performance of the operations as described herein, including the non-limiting methods as illustrated in the flow diagrams of FIG. 7.

Operation 702 depicts monitoring, by a device comprising a processor, a communication traffic flow performance using a group of buffer parameters of a network node device of a wireless network. In some embodiments, the eNB/gNB buffer management xApp running on the RIC will monitor the RAN and the flow performance and dynamically tune the available policies through the E2 interface. Operation 704 depicts determining if the traffic flow needs adjustment. If the traffic flow needs adjustment, perform Operation 706. Otherwise, continue monitoring. Operation 706 depicts receiving, by the device, required performance characteristics of the communication traffic flow performance via an interface (e.g., the per-flow requirements of throughput, latency, or application burst characteristics are communicated to the xAPP of the RIC through the A1 interface). Operation 708 depicts based on performance values, adjusting, by the device, a buffer parameter of a network node device of the wireless network based on an adjustment value. The xApp will run an algorithm (described below) to optimize the application performance (e.g., the algorithm can explore the state space and arrive at the optimal solution for each flow). The buffer control algorithm measures the throughput and per-packet delay of each flow. The algorithm periodically performs small experiments by adjusting the buffer sizes or queuing policy at a flow. Tuning the scheduling algorithm is performed at a slower time scale. The results of these experiments will be evaluated to see if the flow meets its performance requirements of throughput and latency. Operation 710 depicts based on the required performance characteristics, determining, by the device, that the buffer parameter is available for adjustment to satisfy the communication traffic flow performance.

Figure 8:
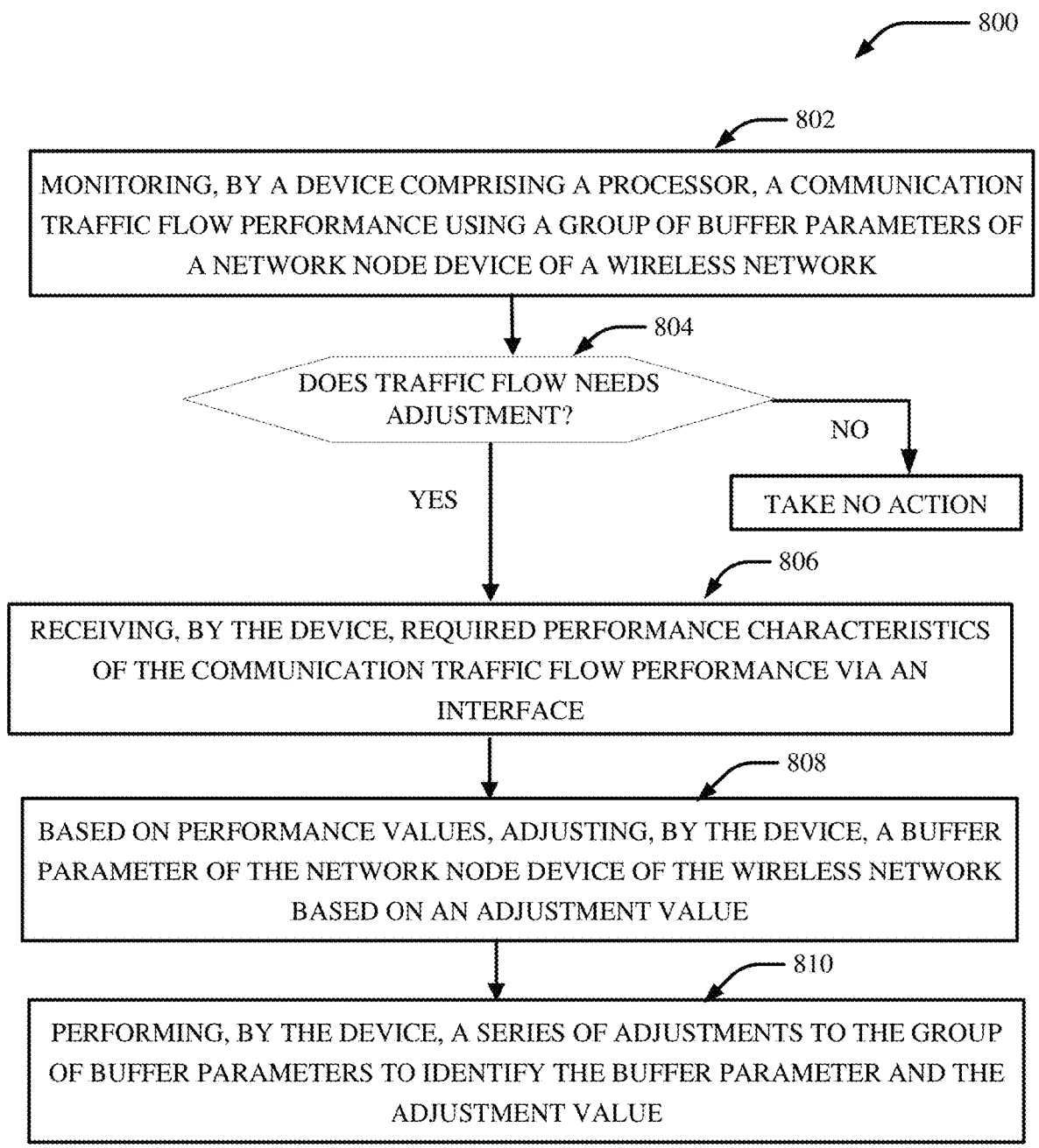
FIG. 8 depicts a diagram of an example, non-limiting computer implemented method that facilitates flexible buffer management for optimizing congestion control using radio access network (RAN) intelligent controller in accordance with one or more embodiments described herein.

FIG. 8 depicts a diagram of an example, non-limiting computer implemented method that facilitates flexible buffer management for optimizing congestion control using radio access network (RAN) intelligent controller in accordance with one or more embodiments described herein. In some examples, flow diagram 800 can be implemented by operating environment 1000 described below. It can be appreciated that the operations of flow diagram 800 can be implemented in a different order than is depicted.

In non-limiting example embodiments, a computing device (or system) (e.g., computer 1004) is provided, the device or system comprising one or more processors and one or more memories that stores executable instructions that, when executed by the one or more processors, can facilitate performance of the operations as described herein, including the non-limiting methods as illustrated in the flow diagrams of FIG. 8.

Operation 802 depicts monitoring, by a device comprising a processor, a communication traffic flow performance using a group of buffer parameters of a network node device of a wireless network. In some embodiments, the eNB/gNB buffer management xApp running on the RIC will monitor the RAN and the flow performance and dynamically tune the available policies through the E2 interface. Operation 804 depicts determining if the traffic flow needs adjustment. If the traffic flow needs adjustment, perform Operation 806. Otherwise, continue monitoring. Operation 806 depicts receiving, by the device, required performance characteristics of the communication traffic flow performance via an interface (e.g., the per-flow requirements of throughput, latency, or application burst characteristics are communicated to the xAPP of the RIC through the A1 interface). Operation 808 depicts based on performance values, adjusting, by the device, a buffer parameter of a network node device of the wireless network based on an adjustment value. The xApp will run an algorithm (described below) to optimize the application performance (e.g., the algorithm can explore the state space and arrive at the optimal solution for each flow). The buffer control algorithm measures the throughput and per-packet delay of each flow. The algorithm periodically performs small experiments by adjusting the buffer sizes or queuing policy at a flow. Tuning the scheduling algorithm is performed at a slower time scale. The results of these experiments will be evaluated to see if the flow meets its performance requirements of throughput and latency. Operation 810 depicts performing, by the device, a series of adjustments to the group of buffer parameters to identify the buffer parameter and the adjustment value.

Figure 9:
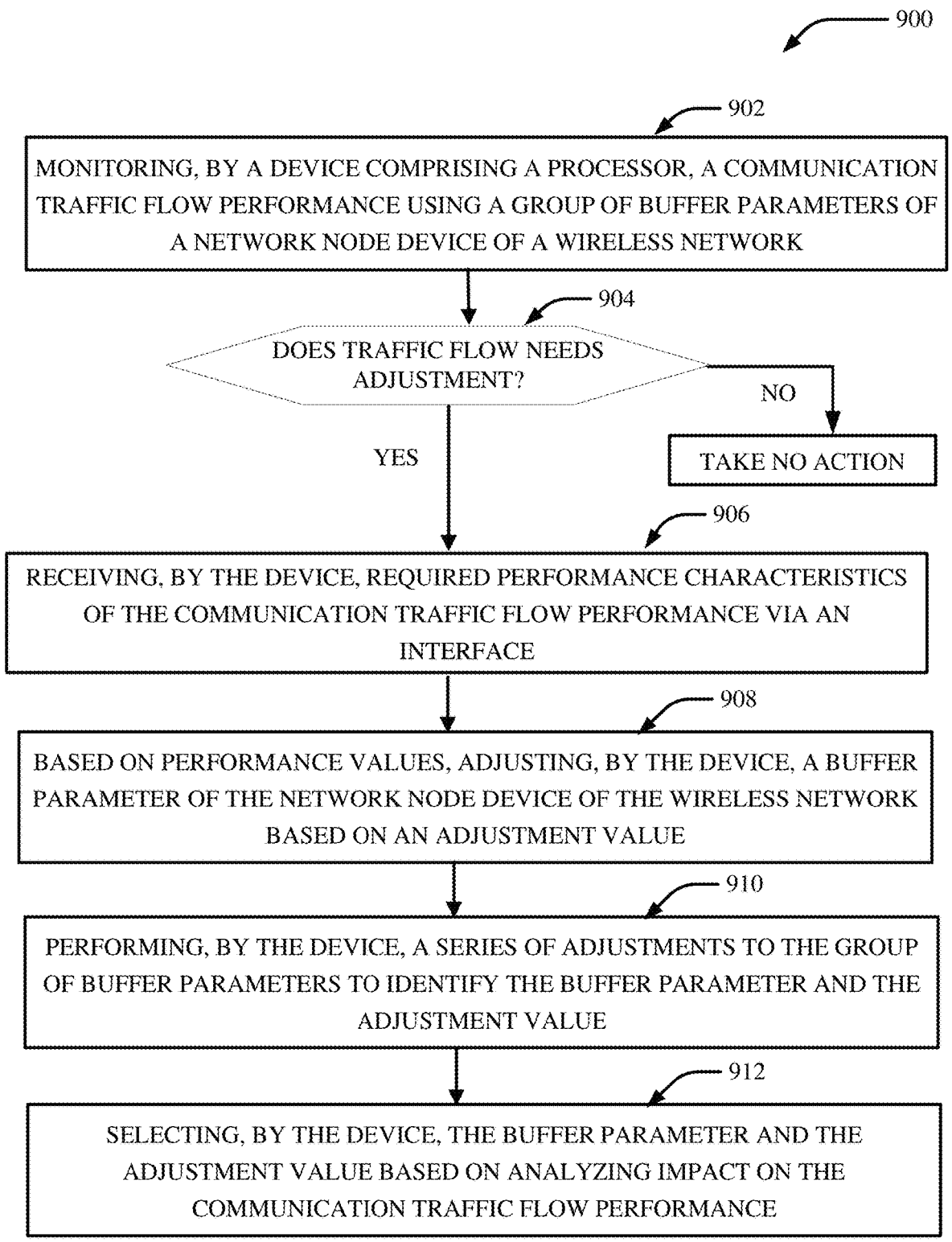
FIG. 9 depicts a diagram of an example, non-limiting computer implemented method that facilitates flexible buffer management for optimizing congestion control using radio access network (RAN) intelligent controller in accordance with one or more embodiments described herein.

FIG. 9 depicts a diagram of an example, non-limiting computer implemented method that facilitates flexible buffer management for optimizing congestion control using radio access network (RAN) intelligent controller in accordance with one or more embodiments described herein. In some examples, flow diagram 900 can be implemented by operating environment 1000 described below. It can be appreciated that the operations of flow diagram 900 can be implemented in a different order than is depicted.

In non-limiting example embodiments, a computing device (or system) (e.g., computer 1004) is provided, the device or system comprising one or more processors and one or more memories that stores executable instructions that, when executed by the one or more processors, can facilitate performance of the operations as described herein, including the non-limiting methods as illustrated in the flow diagrams of FIG. 9.

Operation 902 depicts monitoring, by a device comprising a processor, a communication traffic flow performance using a group of buffer parameters of a network node device of a wireless network. In some embodiments, the eNB/gNB buffer management xApp running on the RIC will monitor the RAN and the flow performance and dynamically tune the available policies through the E2 interface. Operation 904 depicts determining if the traffic flow needs adjustment. If the traffic flow needs adjustment, perform Operation 906. Otherwise, continue monitoring. Operation 906 depicts receiving, by the device, required performance characteristics of the communication traffic flow performance via an interface (e.g., the per-flow requirements of throughput, latency, or application burst characteristics are communicated to the xAPP of the RIC through the A1 interface). Operation 908 depicts based on performance values, adjusting, by the device, a buffer parameter of a network node device of the wireless network based on an adjustment value. The xApp will run an algorithm to optimize the application performance (e.g., the algorithm can explore the state space and arrive at the optimal solution for each flow). The buffer control algorithm measures the throughput and per-packet delay of each flow. The algorithm periodically performs small experiments by adjusting the buffer sizes or queuing policy at a flow. Tuning the scheduling algorithm is performed at a slower time scale. The results of these experiments will be evaluated to see if the flow meets its performance requirements of throughput and latency. Operation 910 depicts performing, by the device, a series of adjustments to the group of buffer parameters to identify the buffer parameter and the adjustment value. Operation 912 depicts selecting, by the device, the buffer parameter and the adjustment value based on analyzing impact on the communication traffic flow performance.

Figure 10:
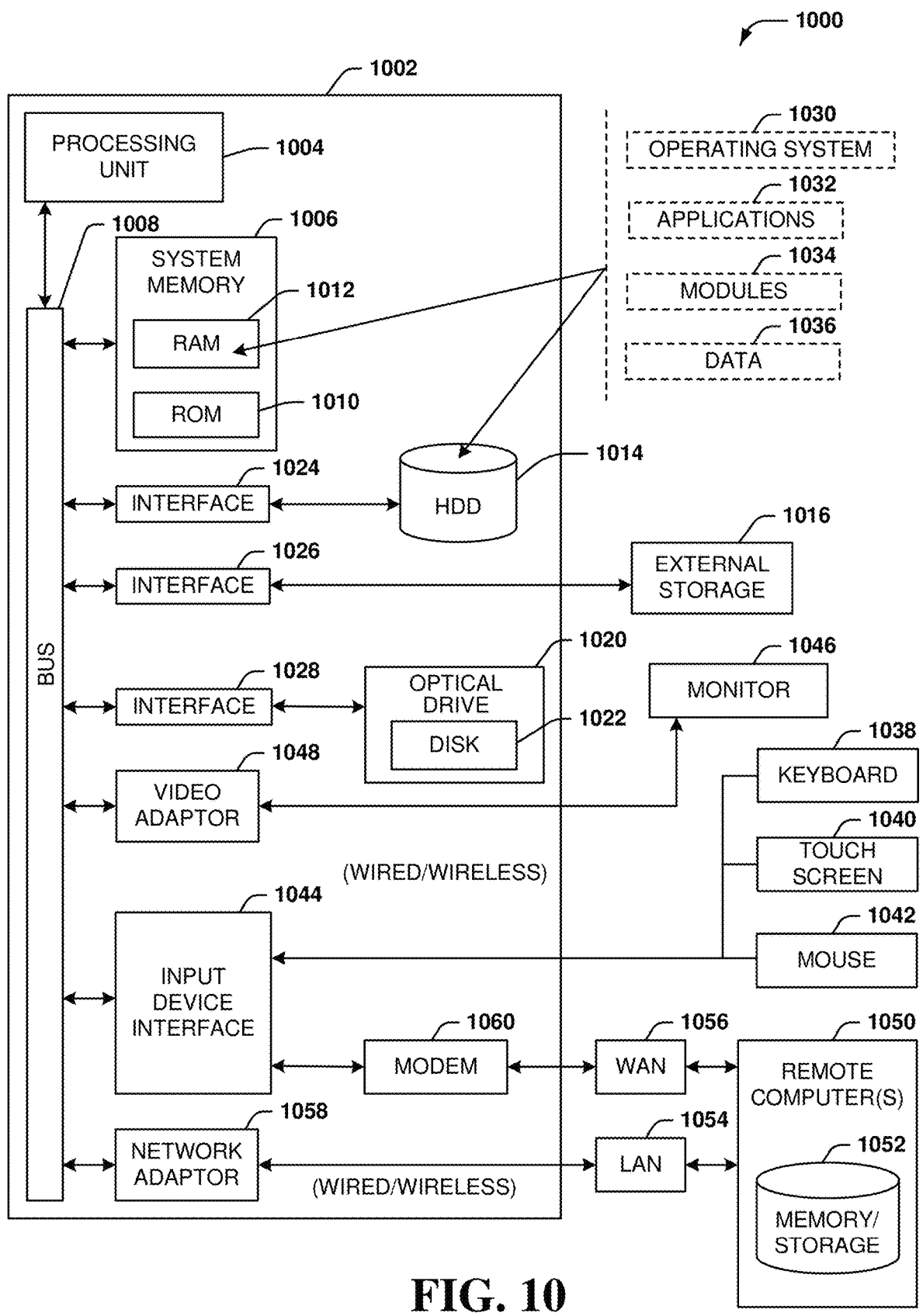
FIG. 10 illustrates an example block diagram of an example computer operable to engage in a system architecture that facilitates secure wireless communication according to one or more embodiments described herein.

Referring now to FIG. 10, illustrated is an example block diagram of an example computer 1000 operable to engage in a system architecture that facilitates wireless communications according to one or more embodiments described herein. The computer 1000 can provide networking and communication capabilities between a wired or wireless communication network and a server and/or communication device.

In order to provide additional context for various embodiments described herein, FIG. 10 and the following discussion are intended to provide a brief, general description of a suitable computing environment 1000 in which the various embodiments of the embodiment described herein can be implemented. While the embodiments have been described above in the general context of computer-executable instructions that can run on one or more computers, those skilled in the art will recognize that the embodiments can be also implemented in combination with other program modules and/or as a combination of hardware and software.

Generally, program modules include routines, programs, components, data structures, etc., that perform particular tasks or implement particular abstract data types. Moreover, those skilled in the art will appreciate that the methods can be practiced with other computer system configurations, including single-processor or multiprocessor computer systems, minicomputers, mainframe computers, Internet of Things (IoT) devices, distributed computing systems, as well as personal computers, hand-held computing devices, microprocessor-based or programmable consumer electronics, and the like, each of which can be operatively coupled to one or more associated devices.

The illustrated embodiments of the embodiments herein can be also practiced in distributed computing environments where certain tasks are performed by remote processing devices that are linked through a communications network. In a distributed computing environment, program modules can be located in both local and remote memory storage devices.

Computing devices typically include a variety of media, which can include computer-readable storage media, machine-readable storage media, and/or communications media, which two terms are used herein differently from one another as follows. Computer-readable storage media or machine-readable storage media can be any available storage media that can be accessed by the computer and includes both volatile and nonvolatile media, removable and non-removable media. By way of example, and not limitation, computer-readable storage media or machine-readable storage media can be implemented in connection with any method or technology for storage of information such as computer-readable or machine-readable instructions, program modules, structured data or unstructured data.

Computer-readable storage media can include, but are not limited to, random access memory (RAM), read only memory (ROM), electrically erasable programmable read only memory (EEPROM), flash memory or other memory technology, compact disk read only memory (CD-ROM), digital versatile disk (DVD), Blu-ray disc (BD) or other optical disk storage, magnetic cassettes, magnetic tape, magnetic disk storage or other magnetic storage devices, solid state drives or other solid state storage devices, or other tangible and/or non-transitory media which can be used to store desired information. In this regard, the terms "tangible" or "non-transitory" herein as applied to storage, memory or computer-readable media, are to be understood to exclude only propagating transitory signals per se as modifiers and do not relinquish rights to all standard storage, memory or computer-readable media that are not only propagating transitory signals per se.

Computer-readable storage media can be accessed by one or more local or remote computing devices, e.g., via access requests, queries or other data retrieval protocols, for a variety of operations with respect to the information stored by the medium.

Communications media typically embody computer-readable instructions, data structures, program modules or other structured or unstructured data in a data signal such as a modulated data signal, e.g., a carrier wave or other transport mechanism, and includes any information delivery or transport media. The term "modulated data signal" or signals refers to a signal that has one or more of its characteristics set or changed in such a manner as to encode information in one or more signals. By way of example, and not limitation, communication media include wired media, such as a wired network or direct-wired connection, and wireless media such as acoustic, RF, infrared and other wireless media.

With reference again to FIG. 10, the example environment 1000 for implementing various embodiments of the aspects described herein includes a computer 1002, the computer 1002 including a processing unit 1004, a system memory 1006 and a system bus 1008. The system bus 1008 couples system components including, but not limited to, the system memory 1006 to the processing unit 1004. The processing unit 1004 can be any of various commercially available processors. Dual microprocessors and other multi-processor architectures can also be employed as the processing unit 1004.

The system bus 1008 can be any of several types of bus structure that can further interconnect to a memory bus (with or without a memory controller), a peripheral bus, and a local bus using any of a variety of commercially available bus architectures. The system memory 1006 includes ROM 1010 and RAM 1012. A basic input/output system (BIOS) can be stored in a non-volatile memory such as ROM, erasable programmable read only memory (EPROM), EEPROM, which BIOS contains the basic routines that help to transfer information between elements within the computer 1002, such as during startup. The RAM 1012 can also include a high-speed RAM such as static RAM for caching data.

The computer 1002 further includes an internal hard disk drive (HDD) 1014 (e.g., EIDE, SATA), one or more external storage devices 1016 (e.g., a magnetic floppy disk drive (FDD) 1016, a memory stick or flash drive reader, a memory card reader, etc.) and an optical disk drive 1020 (e.g., which can read or write from a CD-ROM disc, a DVD, a BD, etc.). While the internal HDD 1014 is illustrated as located within the computer 1002, the internal HDD 1014 can also be configured for external use in a suitable chassis (not shown). Additionally, while not shown in environment 1000, a solid state drive (SSD) could be used in addition to, or in place of, an HDD 1014. The HDD 1014, external storage device(s) 1016 and optical disk drive 1020 can be connected to the system bus 1008 by an HDD interface 1024, an external storage interface 1026 and an optical drive interface 1028, respectively. The interface 1024 for external drive implementations can include at least one or both of Universal Serial Bus (USB) and Institute of Electrical and Electronics Engineers (IEEE) 1394 interface technologies. Other external drive connection technologies are within contemplation of the embodiments described herein.

The drives and their associated computer-readable storage media provide nonvolatile storage of data, data structures, computer-executable instructions, and so forth. For the computer 1002, the drives and storage media accommodate the storage of any data in a suitable digital format. Although the description of computer-readable storage media above refers to respective types of storage devices, it should be appreciated by those skilled in the art that other types of storage media which are readable by a computer, whether presently existing or developed in the future, could also be used in the example operating environment, and further, that any such storage media can contain computer-executable instructions for performing the methods described herein.

A number of program modules can be stored in the drives and RAM 1012, including an operating system 1030, one or more application programs 1032, other program modules 1034 and program data 1036. All or portions of the operating system, applications, modules, and/or data can also be cached in the RAM 1012. The systems and methods described herein can be implemented utilizing various commercially available operating systems or combinations of operating systems.

Computer 1002 can optionally comprise emulation technologies. For example, a hypervisor (not shown) or other intermediary can emulate a hardware environment for operating system 1030, and the emulated hardware can optionally be different from the hardware illustrated in FIG. 10. In such an embodiment, operating system 1030 can comprise one virtual machine (VM) of multiple VMs hosted at computer 1002. Furthermore, operating system 1030 can provide runtime environments, such as the Java runtime environment or the .NET framework, for applications 1032. Runtime environments are consistent execution environments that allow applications 1032 to run on any operating system that includes the runtime environment. Similarly, operating system 1030 can support containers, and applications 1032 can be in the form of containers, which are lightweight, standalone, executable packages of software that include, e.g., code, runtime, system tools, system libraries and settings for an application.

Further, computer 1002 can be enable with a security module, such as a trusted processing module (TPM). For instance with a TPM, boot components hash next in time boot components, and wait for a match of results to secured values, before loading a next boot component. This process can take place at any layer in the code execution stack of computer 1002, e.g., applied at the application execution level or at the operating system (OS) kernel level, thereby enabling security at any level of code execution.

A user can enter commands and information into the computer 1002 through one or more wired/wireless input devices, e.g., a keyboard 1038, a touch screen 1040, and a pointing device, such as a mouse 1042. Other input devices (not shown) can include a microphone, an infrared (IR) remote control, a radio frequency (RF) remote control, or other remote control, a joystick, a virtual reality controller and/or virtual reality headset, a game pad, a stylus pen, an image input device, e.g., camera(s), a gesture sensor input device, a vision movement sensor input device, an emotion or facial detection device, a biometric input device, e.g., fingerprint or iris scanner, or the like. These and other input devices are often connected to the processing unit 1004 through an input device interface 1044 that can be coupled to the system bus 1008, but can be connected by other interfaces, such as a parallel port, an IEEE 1394 serial port, a game port, a USB port, an IR interface, a BLUETOOTH® interface, etc.

A monitor 1046 or other type of display device can be also connected to the system bus 1008 via an interface, such as a video adapter 1048. In addition to the monitor 1046, a computer typically includes other peripheral output devices (not shown), such as speakers, printers, etc.

The computer 1002 can operate in a networked environment using logical connections via wired and/or wireless communications to one or more remote computers, such as a remote computer(s) 1050. The remote computer(s) 1050 can be a workstation, a server computer, a router, a personal computer, portable computer, microprocessor-based entertainment appliance, a peer device or other common network node, and typically includes many or all of the elements described relative to the computer 1002, although, for purposes of brevity, only a memory/storage device 1052 is illustrated. The logical connections depicted include wired/wireless connectivity to a local area network (LAN) 1054 and/or larger networks, e.g., a wide area network (WAN) 1056. Such LAN and WAN networking environments are commonplace in offices and companies, and facilitate enterprise-wide computer networks, such as intranets, all of which can connect to a global communications network, e.g., the Internet.

When used in a LAN networking environment, the computer 1002 can be connected to the local network 1054 through a wired and/or wireless communication network interface or adapter 1058. The adapter 1058 can facilitate wired or wireless communication to the LAN 1054, which can also include a wireless access point (AP) disposed thereon for communicating with the adapter 1058 in a wireless mode.

When used in a WAN networking environment, the computer 1002 can include a modem 1060 or can be connected to a communications server on the WAN 1056 via other means for establishing communications over the WAN 1056, such as by way of the Internet. The modem 1060, which can be internal or external and a wired or wireless device, can be connected to the system bus 1008 via the input device interface 1044. In a networked environment, program modules depicted relative to the computer 1002 or portions thereof, can be stored in the remote memory/storage device 1052. It will be appreciated that the network connections shown are example and other means of establishing a communications link between the computers can be used.

When used in either a LAN or WAN networking environment, the computer 1002 can access cloud storage systems or other network-based storage systems in addition to, or in place of, external storage devices 1016 as described above. Generally, a connection between the computer 1002 and a cloud storage system can be established over a LAN 1054 or WAN 1056 e.g., by the adapter 1058 or modem 1060, respectively. Upon connecting the computer 1002 to an associated cloud storage system, the external storage interface 1026 can, with the aid of the adapter 1058 and/or modem 1060, manage storage provided by the cloud storage system as it would other types of external storage. For instance, the external storage interface 1026 can be configured to provide access to cloud storage sources as if those sources were physically connected to the computer 1002.

The computer 1002 can be operable to communicate with any wireless devices or entities operatively disposed in wireless communication, e.g., a printer, scanner, desktop and/or portable computer, portable data assistant, communications satellite, any piece of equipment or location associated with a wirelessly detectable tag (e.g., a kiosk, news stand, store shelf, etc.), and telephone. This can include Wireless Fidelity (Wi-Fi) and BLUETOOTH® wireless technologies. Thus, the communication can be a predefined structure as with a conventional network or simply an ad hoc communication between at least two devices.

The above description of illustrated embodiments of the subject disclosure, including what is described in the Abstract, is not intended to be exhaustive or to limit the disclosed embodiments to the precise forms disclosed. While specific embodiments and examples are described herein for illustrative purposes, various modifications are possible that are considered within the scope of such embodiments and examples, as those skilled in the relevant art can recognize.

In this regard, while the disclosed subject matter has been described in connection with various embodiments and corresponding Figures, where applicable, it is to be understood that other similar embodiments can be used or modifications and additions can be made to the described embodiments for performing the same, similar, alternative, or substitute function of the disclosed subject matter without deviating therefrom. Therefore, the disclosed subject matter should not be limited to any single embodiment described herein, but rather should be construed in breadth and scope in accordance with the appended claims below.

As it employed in the subject specification, the term "processor" can refer to substantially any computing processing unit or device comprising, but not limited to comprising, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Processors can exploit nano-scale architectures such as, but not limited to, molecular and quantum-dot based transistors, switches and gates, in order to optimize space usage or enhance performance of user equipment. A processor may also be implemented as a combination of computing processing units.

In the subject specification, terms such as "store," "storage," "data store," data storage," "database," and substantially any other information storage component relevant to operation and functionality of a component, refer to "memory components," or entities embodied in a "memory" or components comprising the memory. It will be appreciated that the memory components described herein can be either volatile memory or nonvolatile memory, or can include both volatile and nonvolatile memory.

As used in this application, the terms "component," "system," "platform," "layer," "selector," "interface," and the like are intended to refer to a computer-related entity or an entity related to an operational apparatus with one or more specific functionalities, wherein the entity can be either hardware, a combination of hardware and software, software, or software in execution. As an example, a component may be, but is not limited to being, a process running on a processor, a processor, an object, an executable, a thread of execution, a program, and/or a computer. By way of illustration and not limitation, both an application running on a server and the server can be a component. One or more components may reside within a process and/or thread of execution and a component may be localized on one computer and/or distributed between two or more computers. In addition, these components can execute from various computer readable media, device readable storage devices, or machine readable media having various data structures stored thereon. The components may communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor, wherein the processor can be internal or external to the apparatus and executes at least a part of the software or firmware application. As yet another example, a component can be an apparatus that provides specific functionality through electronic components without mechanical parts, the electronic components can include a processor therein to execute software or firmware that confers at least in part the functionality of the electronic components.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form.

Moreover, terms like "user equipment (UE)," "mobile station," "mobile," subscriber station," "subscriber equipment," "access terminal," "terminal," "handset," and similar terminology, refer to a wireless device utilized by a subscriber or user of a wireless communication service to receive or convey data, control, voice, video, sound, gaming, or substantially any data-stream or signaling-stream. The foregoing terms are utilized interchangeably in the subject specification and related drawings. Likewise, the terms "access point (AP)," "base station," "NodeB," "evolved Node B (eNodeB)," "home Node B (HNB)," "home access point (HAP)," "cell device," "sector," "cell," "relay device," "node," "point," and the like, are utilized interchangeably in the subject application, and refer to a wireless network component or appliance that serves and receives data, control, voice, video, sound, gaming, or substantially any datastream or signaling-stream to and from a set of subscriber stations or provider enabled devices. Data and signaling streams can include packetized or frame-based flows.

Additionally, the terms "core-network", "core", "core carrier network", "carrier-side", or similar terms can refer to components of a telecommunications network that typically provides some or all of aggregation, authentication, call control and switching, charging, service invocation, or gateways. Aggregation can refer to the highest level of aggregation in a service provider network wherein the next level in the hierarchy under the core nodes is the distribution networks and then the edge networks. UEs do not normally connect directly to the core networks of a large service provider but can be routed to the core by way of a switch or radio area network. Authentication can refer to determinations regarding whether the user requesting a service from the telecom network is authorized to do so within this network or not. Call control and switching can refer determinations related to the future course of a call stream across carrier equipment based on the call signal processing. Charging can be related to the collation and processing of charging data generated by various network nodes. Two common types of charging mechanisms found in present day networks can be prepaid charging and postpaid charging. Service invocation can occur based on some explicit action (e.g. call transfer) or implicitly (e.g., call waiting). It is to be noted that service "execution" may or may not be a core network functionality as third party network/nodes may take part in actual service execution. A gateway can be present in the core network to access other networks. Gateway functionality can be dependent on the type of the interface with another network.

Furthermore, the terms "user," "subscriber," "customer," "consumer," "prosumer," "agent," and the like are employed interchangeably throughout the subject specification, unless context warrants particular distinction(s) among the terms. It should be appreciated that such terms can refer to human entities or automated components (e.g., supported through artificial intelligence, as through a capacity to make inferences based on complex mathematical formalisms), that can provide simulated vision, sound recognition and so forth.

Aspects, features, or advantages of the subject matter can be exploited in substantially any, or any, wired, broadcast, wireless telecommunication, radio technology or network, or combinations thereof. Non-limiting examples of such technologies or networks include Geocast technology; broadcast technologies (e.g., sub-Hz, ELF, VLF, LF, MF, HF, VHF, UHF, SHF, THz broadcasts, etc.); Ethernet; X.25; powerline-type networking (e.g., PowerLine AV Ethernet, etc.); femto-cell technology; Wi-Fi; Worldwide Interoperability for Microwave Access (WiMAX); Enhanced General Packet Radio Service (Enhanced GPRS); Third Generation Partnership Project (3GPP or 3G) Long Term Evolution (LTE); 3GPP Universal Mobile Telecommunications System (UMTS) or 3GPP UMTS; Third Generation Partnership Project 2 (3GPP2) Ultra Mobile Broadband (UMB); High Speed Packet Access (HSPA); High Speed Downlink Packet Access (HSDPA); High Speed Uplink Packet Access (HSUPA); GSM Enhanced Data Rates for GSM Evolution (EDGE) Radio Access Network (RAN) or GERAN; UMTS Terrestrial Radio Access Network (UTRAN); or LTE Advanced.

What has been described above includes examples of systems and methods illustrative of the disclosed subject matter. It is, of course, not possible to describe every combination of components or methods herein. One of ordinary skill in the art may recognize that many further combinations and permutations of the disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

While the various embodiments are susceptible to various modifications and alternative constructions, certain illustrated implementations thereof are shown in the drawings and have been described above in detail. It should be understood, however, that there is no intention to limit the various embodiments to the specific forms disclosed, but on the contrary, the intention is to cover all modifications, alternative constructions, and equivalents falling within the spirit and scope of the various embodiments.

In addition to the various implementations described herein, it is to be understood that other similar implementations can be used or modifications and additions can be made to the described implementation(s) for performing the same or equivalent function of the corresponding implementation(s) without deviating therefrom. Still further, multiple processing chips or multiple devices can share the performance of one or more functions described herein, and similarly, storage can be effected across a plurality of devices. Accordingly, the invention is not to be limited to any single implementation, but rather is to be construed in breadth, spirit and scope in accordance with the appended claims.

What is claimed is:

1. A system, comprising:
a processor; and
a memory that stores executable instructions that, when executed by the processor, facilitate performance of operations, comprising:
monitoring a performance of a communication traffic flow using a group of buffer parameters of a buffer used by network equipment to adjust the communication traffic flow, wherein the performance is measured according to a defined performance criterion;
receiving performance values for requested performance characteristics of the performance of the communication traffic flow via a first interface; and
based on an adjustment value of the performance values, adjusting, via a second interface, a buffer parameter of the group of buffer parameters.

2. The system of claim 1, wherein the operations further comprise:
based on the requested performance characteristics, determining that the buffer parameter is available for adjustment to satisfy the performance of the communication traffic flow.

3. The system of claim 2, wherein the operations further comprise:
performing adjustments to the group of buffer parameters to identify the buffer parameter and the adjustment value; and selecting the buffer parameter and the adjustment value based on analyzing impact on the performance of the communication traffic flow according to the defined performance criterion.

4. The system of claim 1, wherein adjusting the buffer parameter comprises modifying the buffer parameter based on a queueing policy of the network equipment.

5. The system of claim 1, wherein adjusting the buffer parameter comprises modifying the buffer parameter based on a scheduling policy of the network equipment.

6. The system of claim 1, wherein adjusting the buffer parameter comprises modifying a threshold number of packets that are determined to be able to be dropped.

7. The system of claim 1, wherein adjusting the buffer parameter comprises changing a buffer size.

8. The system of claim 1, wherein the requested performance characteristics comprise a throughput characteristic associated with the performance of the communication traffic flow, a latency characteristic associated with the performance of the communication traffic flow and an application burst characteristic associated with the performance of the communication traffic flow.

9. The system of claim 1, wherein the operations further comprise:
determining whether a handover is requested using a handover prediction process; and
in response to a result of the determining indicating that the handover is requested, adjusting a buffer size of the buffer used by the network equipment.

10. A method, comprising:
monitoring, by a device comprising a processor, a communication traffic flow performance of a communication traffic flow using a group of buffer parameters of a buffer used by network equipment to adjust the communication traffic flow;
receiving, by the device, required performance characteristics of the communication traffic flow performance via an interface; and
based on an adjustment value determined from performance values associated with the communication traffic flow performance, adjusting, by the device, a buffer parameter of the buffer.

11. The method of claim 10, further comprising:
based on the required performance characteristics, determining, by the device, that the buffer parameter is available for adjustment to satisfy the communication traffic flow performance.

12. The method of claim 10, further comprising:
performing, by the device, a series of adjustments to the group of buffer parameters to identify the buffer parameter and the adjustment value; and
selecting, by the device, the buffer parameter and the adjustment value based on analyzing impact of the series of adjustments on the communication traffic flow performance.

13. The method of claim 12, wherein performing the series of adjustments comprises adjusting a scheduling policy of the network equipment.

14. The method of claim 12, wherein performing the series of adjustments comprises adjusting a queueing policy of the network equipment.

15. The method of claim 10, wherein adjusting the buffer parameter comprises switching between queuing schemes and switching between scheduling policies of the communication traffic flow.

16. The method of claim 10, wherein the required performance characteristics comprise at least one of a throughput characteristics, a latency characteristic or an application burst characteristic.

17. A non-transitory machine-readable medium, comprising executable instructions that, when executed by a processor, facilitate performance of operations, comprising:
monitoring a performance of a flow of communication traffic using a group of communication parameters of a network node that is part of a network, wherein the group of communication parameters are adjustable to adjust the flow of the communication traffic;
receiving, via a first interface, requested performance characteristics of the performance of the flow of the communication traffic; and
based on an adjustment value of performance values, adjusting, via a second interface, a communication parameter of the group of communication parameters.

18. The non-transitory machine-readable medium of claim 17, wherein the operations further comprise:
based on the requested performance characteristics, determining that the communication parameter is available for adjustment to satisfy the performance of the flow of the communication traffic.

19. The non-transitory machine-readable medium of claim 18, wherein the operations further comprise:
performing adjustments to the group of communication parameters to identify the communication parameter and the adjustment value; and
selecting the communication parameter and the adjustment value based on an analysis of impact of the adjustments on the performance of the flow of the communication traffic.

20. The non-transitory machine-readable medium of claim 17, wherein adjusting the communication parameter comprises switching between queuing schemes associated with the communication traffic and switching between scheduling policies associated with the communication traffic.

* * * * *